US010154217B2

(12) United States Patent
Shiohara

(10) Patent No.: US 10,154,217 B2
(45) Date of Patent: Dec. 11, 2018

(54) IMAGING APPARATUS, IMAGE PROCESSING APPARATUS, AND IMAGING DISPLAY APPARATUS

(71) Applicant: SEIKO EPSON CORPORATION, Tokyo (JP)

(72) Inventor: Ryuichi Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/329,014

(22) PCT Filed: Jul. 30, 2015

(86) PCT No.: PCT/JP2015/003849
§ 371 (c)(1),
(2) Date: Jan. 25, 2017

(87) PCT Pub. No.: WO2016/021162
PCT Pub. Date: Feb. 11, 2016

(65) Prior Publication Data
US 2017/0223298 A1  Aug. 3, 2017

(30) Foreign Application Priority Data

Aug. 8, 2014 (JP) ................................. 2014-162105
Jul. 3, 2015 (JP) ................................. 2015-134238

(51) Int. Cl.
*H04N 5/376* (2011.01)
*H04N 5/225* (2006.01)
(Continued)

(52) U.S. Cl.
CPC ......... *H04N 5/3765* (2013.01); *G09G 3/2092* (2013.01); *H04N 5/04* (2013.01);
(Continued)

(58) Field of Classification Search
None
See application file for complete search history.

(56) References Cited

U.S. PATENT DOCUMENTS

2007/0211153 A1  9/2007 Uchida et al.
2011/0285694 A1* 11/2011 Shiohara ................. G09G 5/12
345/214

(Continued)

FOREIGN PATENT DOCUMENTS

EP        2388772 A2    11/2011
JP    2007-243615 A     9/2007
(Continued)

OTHER PUBLICATIONS

The Extended European Search Report for the corresponding European Patent Application No. 15829249.0 dated Feb. 5, 2018.

*Primary Examiner* — James Hannett

(57) ABSTRACT

An imaging apparatus includes an imaging unit that captures an image of a subject and outputs imaging signals; an image signal generation unit that generates image signals indicative of images to be displayed in respective lines of a display unit based on the imaging signals, and outputs the generated image signals to the display unit; and a timing control unit that controls timings, in which the image signal generation unit outputs the image signals, based on an output completion signals indicative of lines corresponding to the image signals, which are completely output from the image signal generation unit to the display unit, and write completion signals indicative of lines corresponding to the image signals which are generated by the image signal generation unit.

6 Claims, 19 Drawing Sheets

(51) Int. Cl.
*H04N 5/232* (2006.01)
*G09G 3/20* (2006.01)
*H04N 5/04* (2006.01)
*H04N 9/07* (2006.01)

(52) U.S. Cl.
CPC ............ *H04N 5/225* (2013.01); *H04N 5/232* (2013.01); *H04N 5/23293* (2013.01); *H04N 9/07* (2013.01)

(56) References Cited

U.S. PATENT DOCUMENTS

| | | |
|---|---|---|
| 2011/0285734 A1 | 11/2011 | Shiohara |
| 2011/0285894 A1* | 11/2011 | Shiohara .................. G09G 5/12 348/333.01 |
| 2011/0292236 A1 | 12/2011 | Shiohara |
| 2011/0310268 A1 | 12/2011 | Shiohara |
| 2011/0310269 A1 | 12/2011 | Shiohara |
| 2014/0002691 A1 | 1/2014 | Masugi et al. |
| 2014/0009452 A1 | 1/2014 | Shiohara |
| 2014/0125839 A1 | 5/2014 | Shiohara |
| 2014/0327803 A1 | 11/2014 | Shiohara |
| 2014/0333804 A1 | 11/2014 | Shiohara |
| 2014/0362266 A1 | 12/2014 | Shohara |
| 2015/0022688 A1 | 1/2015 | Shiohara |
| 2015/0042860 A1 | 2/2015 | Shiohara et al. |

FOREIGN PATENT DOCUMENTS

| | | |
|---|---|---|
| JP | 2007-295096 A | 11/2007 |
| JP | 2010-268388 A | 11/2010 |
| JP | 2011-244170 A | 12/2011 |
| JP | 2011-249963 A | 12/2011 |
| JP | 2011-252993 A | 12/2011 |
| JP | 2012-004770 A | 1/2012 |
| JP | 2012-004771 A | 1/2012 |
| JP | 2014-011729 A | 1/2014 |
| JP | 2014-093705 A | 5/2014 |

* cited by examiner

IMAGING APPARATUS, IMAGE PROCESSING APPARATUS, AND IMAGING DISPLAY APPARATUS

TECHNICAL FIELD

The present invention relates to an imaging apparatus, an image processing apparatus, and an imaging display apparatus.

BACKGROUND ART

In a so-called mirrorless single-lens digital camera, it is possible to check an image of a subject through a so-called live view operation of displaying an image, which is captured by an image sensor such as a charge coupled device (CCD) or a complementary metal-oxide semiconductor (CMOS) image sensor, according to an image signal on a liquid crystal panel, which is provided on a rear surface of a housing, an electronic view finder (hereinafter, referred to as electronic view finder (EVF)), which is attached to an upper section of the housing, or the like in real time (for example, PTL 1).

CITATION LIST

Patent Literature

PTL 1: Japanese Unexamined Patent Application Publication No. 2014-11729

SUMMARY OF INVENTION

Technical Problem

However, in the live view operation, marked delays occur after an image of the subject is captured by the image sensor and until the image is displayed on the view finder or the like. Therefore, it is difficult to cause a camera to be directed and follow a moving subject. Furthermore, in a case where capturing of a still image is instructed based on a displayed image of the subject, a timing deviation occurs between the displayed image of the subject and an image of an actually captured still image. Particularly, in a case of a fast-moving subject, it is difficult to capture an intended still image.

The present invention is made in consideration of the above-described situation, and an object of the present invention is to provide a technique which reduces delay time after capturing an image until display.

Solution to Problem

In order to solve the above-described problems, an imaging apparatus according to the present invention includes an imaging unit that captures an image of a subject and outputs imaging signals; an image signal generation unit that generates image signals indicative of images to be displayed in respective lines of a display unit based on the imaging signals, and outputs the generated image signals to the display unit; and a timing control unit that controls timings, in which the image process generation unit outputs the image signals, based on display output line information indicative of lines corresponding to the image signals which are completely output from the image signal generation unit to the display unit and image-processed line information indicative of lines corresponding to the image signals which are generated by the image signal generation unit.

According to the present invention, timings, in which the image signals in the respective lines are output to the display unit, are controlled based on the image-processed line information indicative of lines corresponding to the image signals which are generated by the image signal generation unit. Therefore, even in a case where image process time, which is necessary to generate the image signals, varies for respective lines, it is possible to output the image signals of the respective lines to the display unit in timing in which the image process is completed for respective lines.

In addition, according to the present invention, the timings, in which the image signals in the respective lines are output to the display unit, are controlled based on the display output line information indicative of lines corresponding to the image signals which are completely output. Therefore, in a case where the order of output of the image signals of the respective lines is determined, it is possible to output the image signals in timing according to the order of the output.

That is, according to the present invention, it is possible to control the timing, in which the image signals are output, for respective lines. In other words, it is possible to output the image signals of the respective lines in timing in which it is possible to output the image signals of the respective lines. Therefore, it is possible to reduce delays occurring after capturing an image by the imaging unit until display on the display unit, compared to a case where timings, in which the image signals of the respective lines are output, are determined without considering the fact that the image process time varies for respective lines (based on a maximum value or the like of the image process time for respective lines).

In addition, in the above-described imaging apparatus, in a case where the display output line information indicates a line that displays an image previous to a display target line and the image-processed line information indicates a line that displays an image after timing in which an image is displayed in the display target line, the timing control unit may control the image signal generation unit to output an image signal indicative of the image to be displayed in the display target line.

According to the aspect, in a case where the image signal of the display target line is generated and output of an image signal of a preceding display line which displays an image previous to the display target line is completed, it is possible to output the image signal of the display target line. In contrast, in a case where the output of the image signal of the preceding display line is completed and the image signal of the display target line is not generated, it is possible to output the image signal of the display target line in timing in which the image signal of the display target line is generated.

That is, according to the aspect, it is possible to output the image signal of the display target line in timing in which it is possible to output the image signal of the display target line. Therefore, even in a case where the image process time, which is necessary to generate the image signals, varies for respective lines, it is possible to output the image signals of the respective lines to the display unit in timings according to the image process time for respective lines. Accordingly, it is possible to reduce delays occurring after capturing an image by the imaging unit until display on the display unit, compared to the case where timings, in which the image signals of the respective lines are output, are determined without considering the fact that the image process time varies for respective lines.

In addition, in the above-described imaging apparatus, a frame rate of the display unit may be equal to or higher than a frame rate of the imaging unit.

According to the aspect, even in a case where the frame rate of the display unit is equal to or higher than the frame rate of the imaging unit, it is possible to output the image signals of the lines in the timing in which it is possible to output the image signals of the respective lines, and thus it is possible to perform display in synchronization with the frame rate of the imaging unit.

In addition, in the above-described imaging apparatus, the display unit may be capable of displaying the images in the respective lines for each period that is determined by a horizontal synchronization pulse which is output on a regular cycle, the image signal generation unit may output the image signals in synchronization with the horizontal synchronization pulse, and, in a case where the display output line information indicates the line which displays the image previous to the display target line and the image-processed line information indicates the line which displays the image in advance to the display target line, the timing control unit may control the image signal generation unit to stop an output of the image signal indicative of the image to be displayed in the display target line, and, thereafter, may control the image signal generation unit to output the image signal indicative of the image to be displayed in the display target line in synchronization with the horizontal synchronization pulse which is output after the lines indicated by the image-processed line information become the display target line.

According to the aspect, it is possible to control the timings in which the image signals of the respective lines are output with accuracy of a horizontal scan period which is determined using the horizontal synchronization pulse. Therefore, even in the case where the image process time, which is necessary to generate the image signals, varies for respective lines, it is possible to output the image signals of the respective lines to the display unit in timings according to the image process time for respective lines.

In addition, in the above-described imaging apparatus, the display unit may be capable of displaying the images in the respective lines for each period that is determined according to the horizontal synchronization pulse, the image signal generation unit may output the image signals in synchronization with the horizontal synchronization pulse, and the timing control unit may be capable of outputting the horizontal synchronization pulse on a variable cycle, controls the image signal generation unit to stop the output of the image signals indicative of the image to be displayed in the display target line while stopping the output of the horizontal synchronization pulse in a case where the display output line information indicates the line which displays the image previous to the display target line and the image-processed line information indicates the line which displays the image in advance to the display target line, and, thereafter, controls the image signal generation unit to output the horizontal synchronization pulse and to output the image signal indicative of the image to be displayed in the display target line in synchronization with the output horizontal synchronization pulse in the case where the line indicated by the image-processed line information becomes the display target line.

According to the aspect, a time length of the horizontal scan period, which is determined using the horizontal synchronization pulse, is determined according to timing in which it is possible to output the image signals of the respective lines. Therefore, even in the case where the image process time, which is necessary to generate the image signals, varies for respective lines, it is possible to output the image signals of the respective lines to the display unit in timings according to the image process time for respective lines.

In addition, an image processing apparatus according to the present invention includes an image signal generation unit that generates image signals indicative of images to be displayed in respective lines of a display unit based on imaging signals which are output by an imaging unit that captures an image of a subject, and outputs the generated image signals to the display unit; and a timing control unit that controls timings, in which the image process generation unit outputs the image signals, based on display output line information indicative of lines corresponding to the image signals which are completely output from the image signal generation unit to the display unit and image-processed line information indicative of lines corresponding to the image signals which are generated by the image signal generation unit.

According to the present invention, it is possible to control the timings in which the image signals are output for respective lines. That is, in the timing in which it is possible to output the image signals of the respective lines, it is possible to output the image signals of the respective lines. Therefore, it is possible to reduce delays occurring after capturing an image by the imaging unit until display on the display unit, compared to the case where timings, in which the image signals of the respective lines are output, are determined without considering the fact that the image process time varies for respective lines.

In addition, an imaging display apparatus according to the present invention includes the above-described display unit; and the above-described imaging apparatus.

DESCRIPTION OF EMBODIMENTS

Embodiments of the present invention will be described with reference to the accompanying drawing. However, in the respective drawings, dimensions and scales of respective units are appropriately different from actual units. In addition, embodiments which will be described below are suitable detailed examples of the present invention, and thus various technically preferable limitations are applied thereto. However, the scope of the present invention is not limited to the embodiments if a mention particularly limiting the present invention does not exist in the description below.

A. First Embodiment

Hereinafter, an imaging display apparatus 1 according to a first embodiment of the present invention will be described.

1. Configuration of Imaging Display Apparatus

Figure 1:
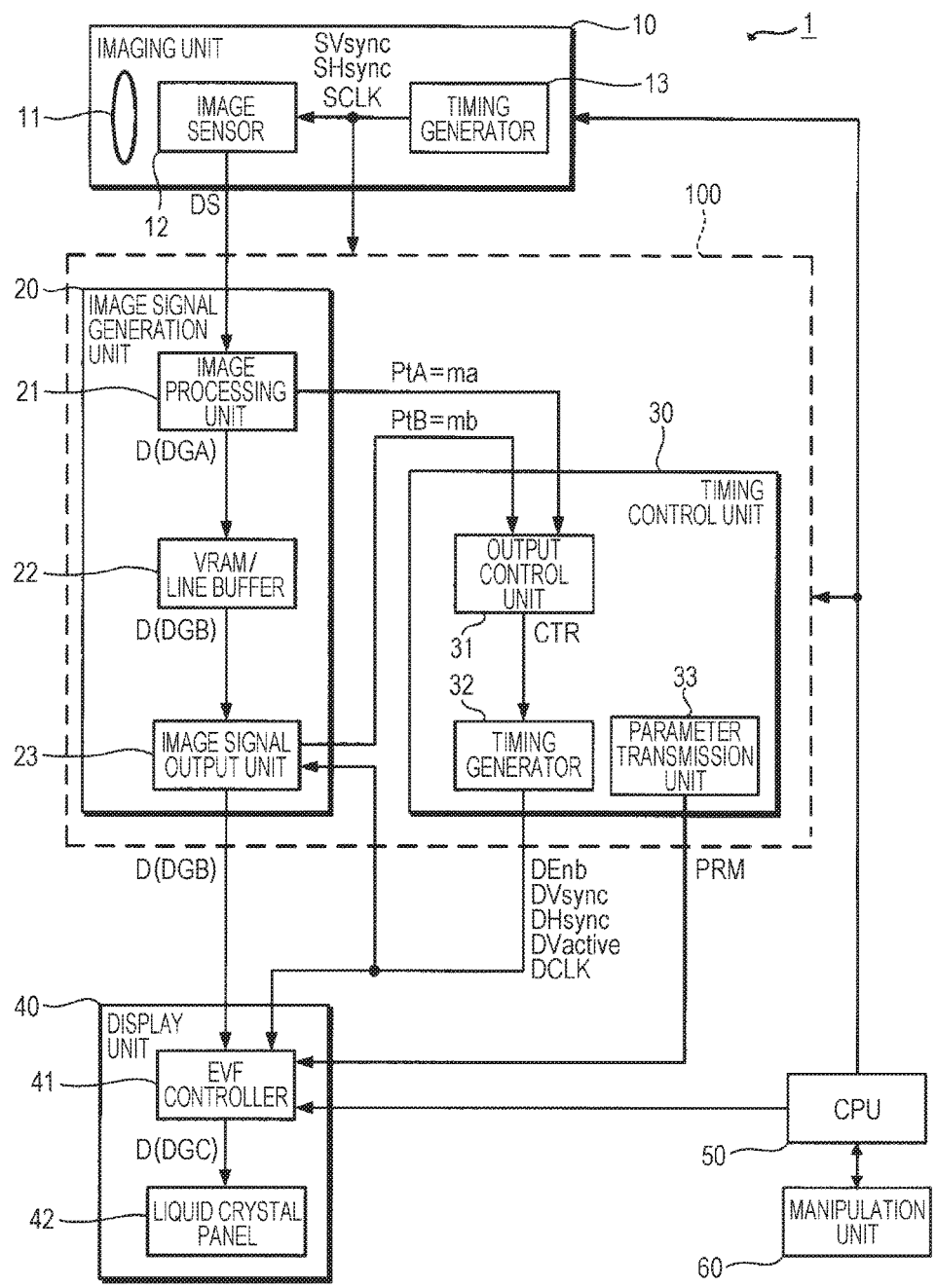
FIG. 1 is a block diagram illustrating a configuration of an imaging display apparatus 1 according to a first embodiment of the present invention.

FIG. 1 is a block diagram illustrating a function of the imaging display apparatus 1.

As illustrated in FIG. 1, the imaging display apparatus 1 includes an imaging unit 10 that captures an image of a subject and outputs data acquired through the imaging as imaging signals DS, an image process circuit 100 that generates image signals D by performing an image process on the imaging signals DS, a display unit 40 that displays an image according to the image signals D, a manipulation unit 60 that changes setting of the imaging display apparatus 1, and inputs an instruction or the like to perform imaging, and a CPU 50 that controls the whole operation of the imaging display apparatus 1.

The imaging display apparatus 1 is a so-called mirrorless digital camera, and is capable of selecting an operation according to a live view mode, in which an image relevant to the subject captured by the imaging unit 10 is displayed on the display unit 40 almost in real time, and an operation according to an imaging mode, in which the image relevant to the subject captured by the imaging unit 10 is stored in a still image storage memory as a still image, through manipulation of the manipulation unit 60 by a user of the imaging display apparatus 1.

Meanwhile, the imaging unit 10, the image process circuit 100, the manipulation unit 60, and the CPU 50 are examples of an "imaging apparatus" excluding the display unit 40 from the imaging display apparatus 1.

The imaging unit 10 includes an imaging optical system 11 that forms an image of the subject, an image sensor 12 that sequentially scans signals from light receiving elements (imaging elements) which are arranged in a matrix shape and that outputs the imaging signals DS according to the image of the subject, and a timing generator 13 that outputs various timing signals to the image sensor 12.

Figure 2:
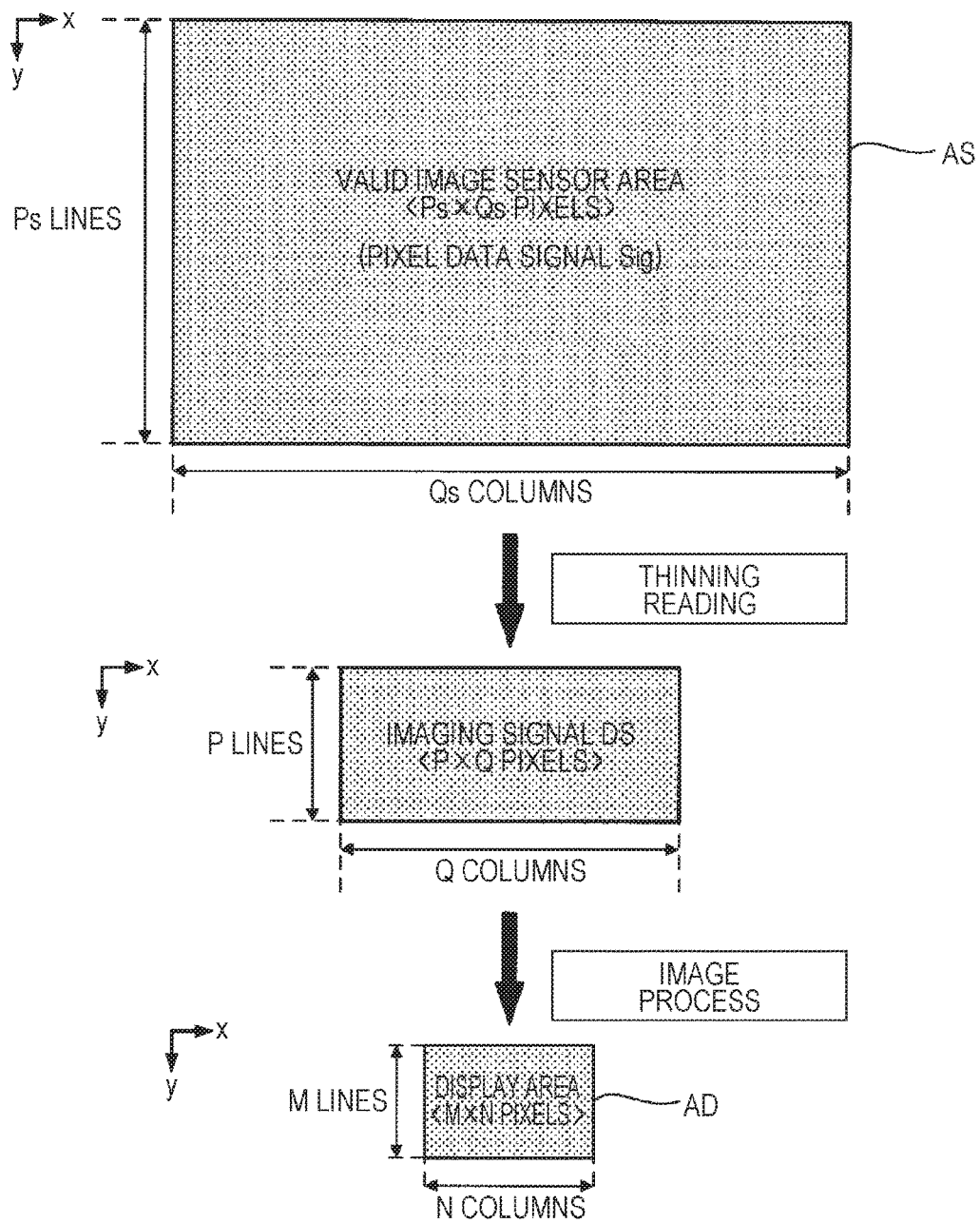
FIG. 2 is an explanatory diagram illustrating a relationship between a valid image sensor area AS and a display area AD.

As illustrated in FIG. 2, in the image sensor 12, a plurality of light receiving elements are arranged in a matrix shape in a valid image sensor area AS such that light receiving elements corresponding to QS columns are arranged in an X axis direction (horizontal direction) and light receiving elements in PS rows (PS lines) are arranged in an Y axis direction (vertical direction) which is perpendicular to the X axis direction (PS and QS are natural numbers which are equal to or larger than 2). In other words, in the valid image sensor area AS, lines, each include the QS light receiving elements arranged in the X axis direction, are disposed as many as the PS rows in the Y axis direction. Each of the light receiving elements generates a pixel data signal Sig according to a detected quantity of light.

In addition, a color filter having any one of a red color, a green color, and a blue color is provided to correspond to each of the light receiving elements one to one. Hereinafter, there is a case where a set, which includes one light receiving element and a color filter provided to correspond to the one light receiving element, is referred to as a pixel of the image sensor 12.

In a case where the imaging display apparatus 1 operates in the imaging mode, the image sensor 12 is capable of outputting all of the pixel data signals Sig, which are output from the light receiving elements in PS rows×QS columns provided in the valid image sensor area AS, as imaging data for a still image. Furthermore, in a case where the imaging data for the still image is output, the image processing unit 21 which will be described later generates still image data by performing various image processes, such as a filtering process, on the imaging data for the still image, and stores the generated still image data in the still image storage memory.

In contrast, in a case where the imaging display apparatus 1 operates in the live view mode, the image sensor 12 reduces data sizes of the pixel data signals Sig by performing thinning reading on the pixel data signals Sig, which are output from the light receiving elements in PS rows×QS columns, and outputs the imaging signals DS corresponding to pixels in P rows×Q columns as illustrated in FIG. 2 (P is a natural number which satisfies 2≤P≤PS. Q is a natural number which satisfies 2≤Q≤QS).

Meanwhile, although the image sensor 12 may include pixels in an area other than the valid image sensor area AS, the pixels in the valid image sensor area AS will not be described for simplification in the specification.

The timing generator 13 generates an imaging vertical synchronization signal SVsync, a horizontal imaging synchronization signal SHsync, and an imaging dot clock signal SCLK, and outputs the generated signals to the image sensor 12 and the image process circuit 100.

Figure 3:
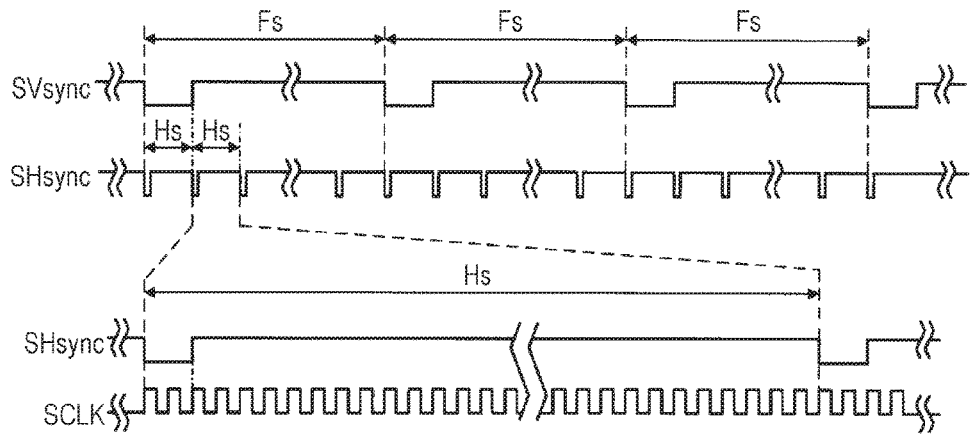
FIG. 3 is a timing chart illustrating an operation of the imaging display apparatus 1.

FIG. 3 is a timing chart illustrating the imaging vertical synchronization signal SVsync, the horizontal imaging synchronization signal SHsync, and the imaging dot clock signal SCLK which are generated by the timing generator 13. The imaging vertical synchronization signal SVsync is a signal which prescribes an imaging vertical scan period Fs in order to read the pixel data signals Sig from the light receiving elements of the whole valid image sensor area AS (in PS lines) of the image sensor 12. The horizontal imaging synchronization signal SHsync is a signal which prescribes a horizontal scan period Hs in order to read the pixel data signals Sig from the light receiving elements corresponding to one line of the valid image sensor area AS. The imaging dot clock signal SCLK is a signal which prescribes timing in order to read the pixel data signal Sig from a light receiving element corresponding to one pixel of the valid image sensor area AS.

A time length of the imaging vertical scan period Fs is regular (fixed length), and a time length of the horizontal scan period Hs is also regular (fixed length). In addition, the imaging vertical scan period Fs includes a plurality of horizontal scan periods Hs.

Description is returned to FIG. 1.

The display unit 40 is an Electronic View Finder (EVF) which causes the user of the imaging display apparatus 1 to recognize the state of a subject by displaying an image indicative of the subject that is an imaging target, and includes a liquid crystal panel 42 that displays an image according to the image signal D generated by the image process circuit 100, and an EVF controller 41 that controls an operation of the liquid crystal panel 42.

As illustrated in FIG. 2, in the liquid crystal panel 42, a plurality of pixels are arranged in a matrix shape such that the pixels form N rows in the X axis direction and M columns (M lines) in the Y axis direction (M is a natural number which satisfies $2 \leq M \leq P$. N is a natural number which satisfies $2 \leq N \leq Q$) in the display area AD. In other words, the display area AD is formed such that lines, which include N pixels arranged in the X axis direction, are disposed as many as M columns in the Y axis direction. The pixels in M rows×N columns include pixels which displays the red color, pixels which displays the green color, and pixels which displays the blue color. In the display area AD, an image, which is generated by the image process circuit 100 according to the image signals D, is displayed.

As described above, $M \leq P$ and $N \leq Q$. That is, there is a case where the number of valid pixels, which are provided in the valid image sensor area AS, is different from the number of pixels which are provided in the display area AD.

Meanwhile, coordinate systems illustrated in FIG. 2 respectively correspond to a coordinate system which is fixed to the valid image sensor area AS, a conceptual coordinate system which displays the imaging signals DS, and a coordinate system which is fixed to the display area AD. The directions of the axes in the three coordinate systems may be different from each other.

A time length, in which the display area AD of the display unit 40 is capable of displaying an image corresponding to one screen, is shorter than a time length in which the imaging unit 10 is capable of capturing the image corresponding to one screen. Therefore, in a case where an image is displayed on a cycle in which the liquid crystal panel 42 is capable of performing display, output of the imaging signals DS from the imaging unit 10 does not keep up. Here, in the imaging display apparatus 1 according to the embodiment, timing, in which the image signals D are output from the image process circuit 100, is adjusted by the image process circuit 100, and thus a display speed of the display unit 40 is caused to follow an cycle in which the imaging signals DS are output from the imaging unit 10.

As illustrated in FIG. 1, the image process circuit 100 includes an image signal generation unit 20 that generates the image signals D based on the imaging signals DS and outputs the generated image signals D to the display unit 40, and a timing control unit 30 that controls timing in which the image signal generation unit 20 outputs the image signals D.

The image signal generation unit 20 includes an image processing unit 21 that generates the image signals D by performing an image process on the imaging signals DS, a VRAM/line buffer 22 (hereinafter, referred to as a "line buffer 22") that temporarily stores the image signals D generated by the image processing unit 21, and an image signal output unit 23 that acquires the image signals D from the line buffer 22 and outputs the acquired image signals D to the display unit 40.

The image signals D are signals that prescribe images (gray scales) to be displayed by the respective pixels in M rows×N columns which are provided in the display area AD of the liquid crystal panel 42. Hereinafter, in the image signals D indicative of images to be displayed in the display area AD, an image signal D corresponding to one line indicative of an image to be displayed in an m-th row line of the display area AD is expressed as an image signal D[m] (m is a natural number which satisfies $1 \leq m \leq M$).

The image processing unit 21 generates the image signals D indicative of images to be displayed in the display area AD of the liquid crystal panel 42 for respective images to be displayed in pixels corresponding to one line. More specifically, the image processing unit 21 generates the image signals D in order of an image signal D[1], an image signal D[2], . . . , an image signal D[M]. Meanwhile, the image process that is performed by the image processing unit 21 will be described in detail later.

In addition, in a case where the image signal D[m] is generated, the image processing unit 21 stores the generated image signal D[m] in the line buffer 22, and outputs a write completion signal PtA, which indicates that the image signal D[m] is completely stored in the line buffer 22, to the timing control unit 30.

In the embodiment, the write completion signal PtA is a signal indicative of a number m of a line corresponding to the image signal D which is completely written in the line buffer 22 by the image processing unit 21. Hereinafter, the number m of the line, which is indicated by the write completion signal PtA, is particularly referred to as a "line number ma" (ma is a natural number which satisfies $1 \leq ma \leq M$). The line number ma, which is a value indicated by the write completion signal PtA, is an example of "image-processed line information" indicative of a line on which the image process is completed.

Meanwhile, the write completion signal PtA is not limited to the signal indicative of the number of the line, and may be a binary signal that includes a pulse waveform which rises to a high level in a case where the image signal D[m] is completely generated by the image processing unit 21. In the case where the write completion signal PtA is the binary signal, the timing control unit 30 may operate a line number of the image signal D[m], which is completely generated by the image processing unit 21, by, for example, counting the number of pulses, which are included in the write completion signal PtA, after display of one screen starts. In this case, pulse waveforms (or the number of pulse waveforms) included in the write completion signal PtA corresponds to the "image-processed line information".

The image signal output unit 23 reads the image signal D from the line buffer 22 for each one line under the control of the timing control unit 30, and outputs the read image signal D[m] corresponding to one line to the display unit 40.

Meanwhile, hereinafter, in a case where discrimination is necessary for convenience of explanation, the image signals D, which are generated by the image processing unit 21 and are stored in the line buffer 22, are referred to as image signals DGA, and the image signals D, which are acquired from the line buffer 22 by the image signal output unit 23 and are output to the display unit 40, are referred to as image signals DGB. In addition, in the image signals DGA which are stored in the line buffer 22 by the image processing unit 21, an image signal DGA indicative of an image to be displayed in an m-th row line of the display area AD is referred to as an image signal DGA[m]. In the image signals DGB which are output to the display unit 40 by the image signal output unit 23, an image signal DGB indicative of an image to be displayed in the m-th row line of the display area AD is referred to as an image signal DGB[m].

In a case where a process of reading the image signal DGB[m] from the line buffer 22 and outputting the image signal DGB[m] to the display unit 40 is completed, the image signal output unit 23 outputs an output completion signal PtB, which indicates that the image signal DGB[m] is completely output to the display unit 40, to the timing control unit 30. In the embodiment, the output completion signal PtB is a signal indicative of the number m of a line corresponding to the image signal D which is completely output to the display unit 40 by the image signal output unit 23. Hereinafter, the number m of the line indicated by the output completion signal PtB is particularly referred to as a "line number mb" (basically, mb is a natural number which satisfies 0≤mb≤M). The line number mb which is a value indicated by the output completion signal PtB is an example of "display output line information" that indicates a line corresponding to the image signal D[m] which is completely output to the display unit 40.

Although being described in detail later, there is a case where the image signal output unit 23 outputs an invalid signal Dmy to the display unit 40, instead of outputting the image signal DGB[m] (refer to FIG. 4D). In this case, the image signal output unit 23 does not output the completion signal PtB.

Also, mb realizes mb=M immediately after a final line of one frame is output, and, thereafter, maintains mb=M. Furthermore, at a point of time in which preparation for an output of an image for a subsequent frame is completed (a timing after a vertical back porch period is completed after the vertical synchronization signal is output), an mb signal is reset such that mb=0.

Meanwhile, the output completion signal PtB is not limited to the signal indicative of the line number, and may be a binary signal that includes a pulse waveform which rises to a high level in a case where the image signal D[m] is completely output by the image signal output unit 23.

As illustrated in FIG. 1, the timing control unit 30 includes an output control unit 31 that generates an output control signal CTR (accurately, CTR[m]) based on the write completion signal PtA and the output completion signal PtB, a timing generator 32 that controls timing in which the image signal output unit 23 outputs the image signal DGB[m] by generating various timing signals, and a parameter transmission unit 33 that transmits a setting parameter PRM, which prescribes an operation of the EVF controller 41, to the EVF controller 41.

The output control unit 31 determines whether or not the image signal output unit 23 completes preparation for an output of the image signal D[m] (image signal DGB[m]) indicative of an image to be displayed in the m-th row of the display area AD to the display unit 40 based on the write completion signal PtA and the output completion signal PtB, and generates the output control signal CTR (accurately, CTR[m]) indicative of a result of the determination.

Here, the "preparation for the output of the image signal D[m] (image signal DGB[m]) is completed" indicates that a first condition and a second condition below are satisfied.
(First Condition)
The image processing unit 21 completes an image process of the image signal D[m] (image signal DGA[m]) of the m-th row, and completely writes the image signal DGA[m] in the line buffer 22.
(Second Condition)
The image signal output unit 23 completely outputs an image signal D[m-1] (image signal DGB[m-1]) in an m-1-th row.

The first condition indicates a case where the line number ma indicated by the write completion signal PtA is equal to or larger than the line number m, that is, the first condition is satisfied in a case of satisfying "m≤ma". The second condition is satisfied in a case where the line number mb indicated by the output completion signal PtB satisfies "mb=m-1" (strictly, in a case where "m=1", "mb=0" (timing after the vertical back porch period is completed after vertical synchronization signal is output after "mb=M"), the mb signal is reset such that mb=0).

In the specification, there is a case where a line of the display area AD that displays an image indicated by the image signal D[m] which is set to the target of determination by the output control unit 31 is referred to as a "display target line".

Meanwhile, strictly, in order to output the image signal DGB[m] by the image signal output unit 23, it is necessary to satisfy a third condition below.
(Third Condition)
Timing in which the image signal output unit 23 outputs an m-th row image signal D[m] (image signal DGB[m]) is included in a period (a horizontal valid data period DHI which will be described later in FIG. 4) in which the display area AD is capable of displaying an image.

However, in a case where the above-described first condition and the second condition are satisfied, the third condition is inevitably satisfied in such a way that the timing generator 32 controls timing in which the image signal DGB[m] is output from the image signal output unit 23. Therefore, in the embodiment, the third condition is not taken into consideration in determination performed by the output control unit 31.

Hereinafter, a method of realizing a control method performed by the output control unit 31 will be described in further detail. The output control unit 31 is capable of determining whether or not the "preparation for the output of the image signal D[m] (image signal DGB[m]) is completed" by, for example, two aspects below.

A first aspect is an aspect in which the output control unit 31 directly performs two determinations including determination (first determination) of whether or not the first condition is satisfied and determination (second determination) of whether or not the second condition is satisfied.

Specifically, in a case where the image processing unit 21 outputs the write completion signal PtA, the output control unit 31 determines (performs the first determination) whether or not m satisfies that "m≤ma" based on the line number ma indicated by the write completion signal PtA. In a case where the image signal output unit 23 outputs the output completion signal PtB, the output control unit 31 determines (performs the second determination) whether or not the line number mb indicated by the output completion signal PtB satisfies "mb=m-1". In a case where a result of determination of the first determination and a result of determination of the second determination are both positive, the output control unit 31 determines that the "preparation for the output of the image signal D[m] is completed".

In this case, the output control unit 31 functions as a "process situation determination unit" that determines whether or not to generate an image signal corresponding to an image to be displayed in the display target line by performing the first determination, and functions as a "display determination unit" that determines whether or not it is possible to display the image in the display target line by performing the second determination.

Meanwhile, in a case where the result of determination of the first determination or the result of determination of the second determination is negative, the output control unit 31 repeats the first determination and the second determination until the result of determination of the first determination and the result of determination of the second determination become both positive. Specifically, the output control unit 31 may perform the first determination whenever the write completion signal PtA is output from the image processing unit 21 and may perform the second determination whenever the output completion signal PtB is output from the image signal output unit 23 until, for example, the results of determinations of the first determination and the second determination become both positive. In addition, for example, the output control unit 31 may repeat the first determination and the second determination on a cycle of a horizontal scan period Hd, which will be described later, until the results of determinations of the first determination and the second determination become both positive. Furthermore, in a case where the result of determination of the first determination and the result of determination of the second determination become both positive, the output control signal CTR (accurately, CTR[m]) is set to a value which indicates that the results of the determinations are positive.

Subsequently, a second aspect of determining whether or not the "preparation for the output of the image signal D[m](image signal DGB[m]) is completed" is an aspect in which the output control unit 31 performs determination (first determination) of whether or not the first condition is satisfied in timing in which the image signal output unit 23 outputs a line number mb=m−1 indicated by the output completion signal PtB after a result of previous determination (determination of whether or not the preparation for an output of the image signal D[m−1] is completed) becomes positive.

In the aspect, in a case where the result of determination of the first determination is negative, the output control unit 31 repeats the first determination until the result of determination of the first determination becomes positive. In a case where the result of determination of the first determination becomes positive, the output control unit 31 sets the output control signal CTR to a value (CTR[m]) which indicates that the result of the determination is positive. Specifically, for example, in a case where the result of determination of the first determination is negative in timing in which the output completion signal PtB is output, thereafter, the output control unit 31 determines whether or not m satisfies "m≤ma" based on the line number ma indicated by the write completion signal PtA whenever the image processing unit 21 outputs the write completion signal PtA. In a case where "m≤ma" is satisfied, it may be determined that the first condition is satisfied.

As described above, the image processing unit 21 generates the image signal D[m] (image signal DGA[m]) in order of line number, the image signal output unit 23 outputs the image signal D[m] (image signal DGB[m]) in order of line number. Furthermore, in the embodiment, after an m−2-th row image signal D[m−2] is completely output and the output control unit 31 determines that the "preparation for the output of the image signal D[m−1] is completed", the image signal output unit 23 outputs the image signal D[m−1]. Accordingly, timing in which the output control unit 31 determines whether or not the "preparation for the output of the image signal D[m] (image signal DGB[m]) is completed" indicates timing after the image signal D[m−2] (image signal DGB[m−2]) is output from the image signal output unit 23 and timing after the output control unit 31 determines that the "preparation for the output of the image signal D[m−1](image signal DGB[m−1]) is completed". That is, in timing in which the output control unit 31 performing the first determination of whether or not the "preparation for the output of the image signal D[m] is completed", the line number mb, which is indicated by the output completion signal PtB output by the image signal output unit 23, is "m−1".

Therefore, in the second aspect, the output control unit 31 considers that the second condition is satisfied with the output of the output completion signal PtB from the image signal output unit 23. Furthermore, the output control unit 31 determines whether or not the "preparation for the output of the image signal D[m] (image signal DGB[m]) is completed" by performing determination (first determination) of whether or not the first condition is satisfied in timing in which the output completion signal PtB is output from the image signal output unit 23.

In the embodiment, description below will be performed on the premise that the second aspect of the above-described two aspects is used.

The timing generator 32 generates a display vertical synchronization signal DVsync, a vertical valid data signal DVactive, a display horizontal synchronization signal DHsync, a display dot clock signal DCLK, and an enable signal DEnb, and outputs the generated signals to the image signal output unit 23 and the display unit 40.

Figure 4A:
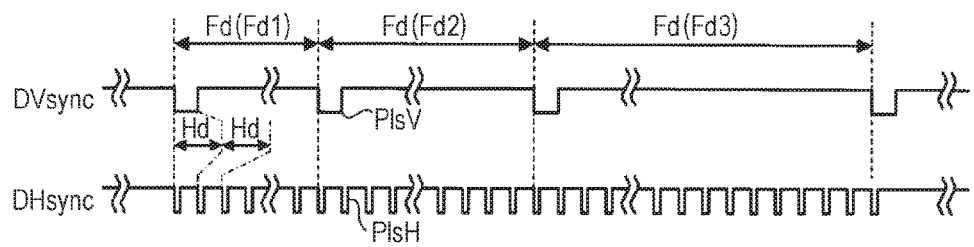
FIG. 4A is a timing chart illustrating the operation of the imaging display apparatus 1.
Figure 4B:
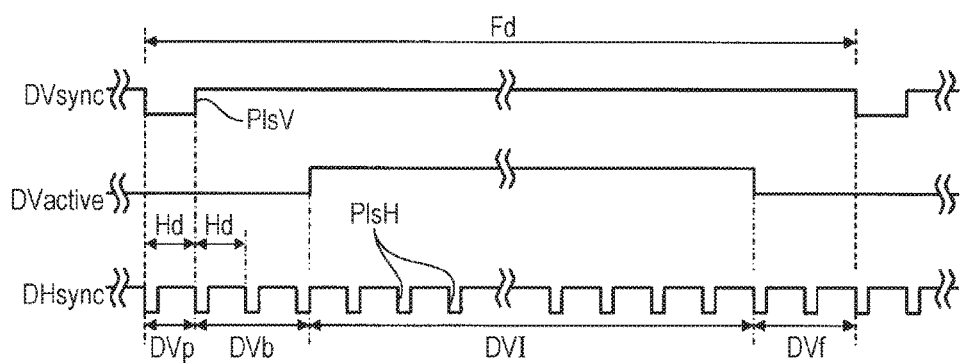
FIG. 4B is a timing chart illustrating the operation of the imaging display apparatus 1.

FIGS. 4A and 4B are timing charts illustrating the display vertical synchronization signal DVsync, the vertical valid data signal DVactive, the display horizontal synchronization signal DHsync, the display dot clock signal DCLK, and the enable signal DEnb which are generated by the timing generator 32.

As illustrated in FIGS. 4A and 4B, the display vertical synchronization signal DVsync is a signal that prescribes a display vertical scan period Fd in order to display images using pixels of the whole (corresponding to M lines) display area AD of the liquid crystal panel 42. The display horizontal synchronization signal DHsync is a signal that prescribes a horizontal scan period Hd in order to display images using pixels corresponding to one line of the display area AD. The display dot clock signal DCLK is a signal that prescribes timing in order to display the images using the respective pixels of the display area AD.

In the embodiment, the horizontal scan period Hd has a predetermined regular time length. In addition, in the embodiment, the display vertical scan period Fd includes a plurality of horizontal scan periods Hd, and has a variable time length (cycle) which is shorter than a time length (cycle) of the imaging vertical scan period Fs. In this case, the number of horizontal scan periods Hd, which are included in each of the display vertical scan period Fd, is variable. An example illustrated in FIG. 4A illustrates an example in which, in the plurality of display vertical scan periods Fd illustrated in FIG. 4A, a display vertical scan period Fd1, which is a first display vertical scan period Fd, is shorter than a display vertical scan period Fd2, which is subsequent to the display vertical scan period Fd1, and the display vertical scan period Fd2 is shorter than a display vertical scan period Fd3 which is subsequent to the display vertical scan period Fd2.

Meanwhile, in waveforms which are included in the display vertical synchronization signal DVsync, a pulse waveform, which prescribes timing in which the display vertical scan period Fd starts and ends, is referred to as a vertical synchronization pulse PlsV. In addition, in waveforms which are included in the display horizontal synchronization signal DHsync, a pulse waveform, which prescribes timing in which the horizontal scan period Hd starts and ends, is referred to as a horizontal synchronization pulse PlsH.

As illustrated in FIG. 4B, the display vertical scan period Fd includes a vertical synchronization period DVp, a vertical back porch period DVb, a vertical valid data period DVI, and a vertical front porch period DVf.

The vertical synchronization period DVp is a period in which the display vertical synchronization signal DVsync is active (low level in the example of the drawing), and is a period which simultaneously starts with start of the display vertical scan period Fd and has a predetermined time length. The vertical back porch period DVb is a period which is subsequent to the vertical synchronization period DVp, and is a period which has a predetermined time length. The vertical valid data period DVI is a period which is subsequent to the vertical back porch period DVb and has a variable time length. In the vertical valid data period DVI, the image signals DGB (image signals DGB[1] to DGB[M]) are output from the image signal output unit 23. The vertical front porch period DVf is a period which is subsequent to the vertical valid data period DVI, simultaneously ends with end of the display vertical scan period Fd, and has a predetermined time length.

The vertical valid data period DVI includes a period from the start of the horizontal scan period Hd, in which the enable signal DEnb initially becomes active, to the end of the horizontal scan period Hd, in which an M-th enable signal DEnb becomes active (a case where the enable signal DEnb becomes active will be described later), in each display vertical scan period Fd.

The vertical valid data period DVI may be decided based on a, for example, a counted value which is output by a counter (not illustrated in the drawing) that counts a number of times that the enable signal DEnb becomes active. However, in the embodiment, for convenience of explanation, a vertical valid data signal DVactive, which becomes active (a high level in the example of the drawing) is introduced in the period from the start of the horizontal scan period Hd, in which the enable signal DEnb initially becomes active, to the horizontal scan period Hd in which the M-th enable signal DEnb becomes active, in each display vertical scan period Fd. That is, in the embodiment, description will be performed while assuming that the period, in which the vertical valid data signal DVactive is active, is the vertical valid data period DVI. Meanwhile, the vertical valid data signal DVactive is a signal which is introduced for convenience of explanation, and the output control unit 31 may not output the vertical valid data signal DVactive.

Figure 4C:
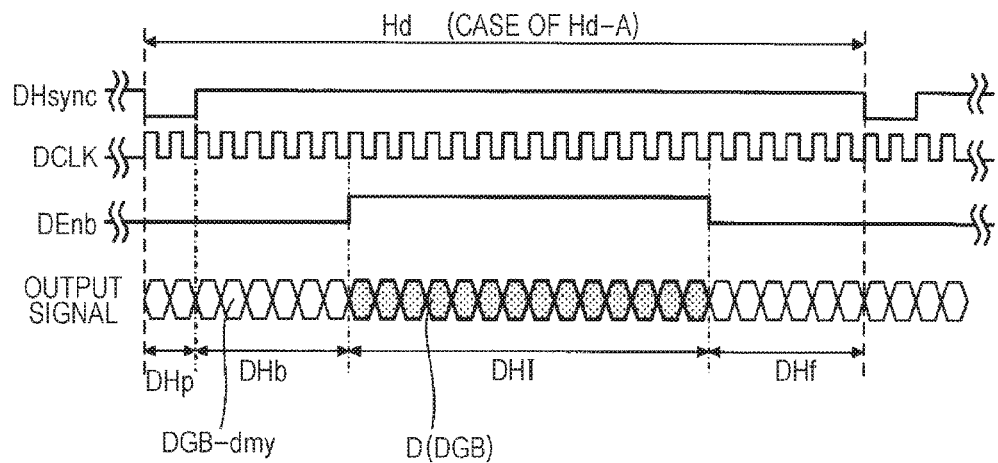
FIG. 4C is a timing chart illustrating the operation of the imaging display apparatus 1.
Figure 4D:
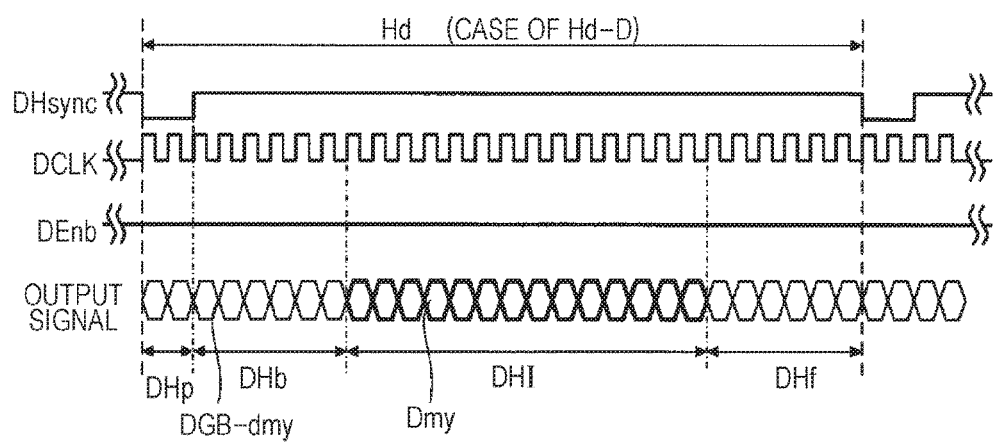
FIG. 4D is a timing chart illustrating the operation of the imaging display apparatus 1.

As illustrated in FIGS. 4C and 4D, the horizontal scan period Hd includes a horizontal synchronization period DHp, a horizontal back porch period DHb, the horizontal valid data period DHI, and a horizontal front porch period DHf.

The horizontal synchronization period DHp is a period in which the display horizontal synchronization signal DHsync is active (low level in an example of the drawing), and is a period which simultaneously starts with start of the horizontal scan period Hd and has a predetermined time length. The horizontal back porch period DHb is a period subsequent to the horizontal synchronization period DHp, and is a period which has a predetermined time length. The horizontal valid data period DHI is a period which is subsequent to the horizontal back porch period DHb and has a predetermined time length. The horizontal front porch period DHf is a period which is subsequent to the horizontal valid data period DHI, and is a period which ends simultaneously with end of the horizontal scan period Hd and has a predetermined time length.

In the embodiment, the horizontal scan period Hd includes a valid horizontal scan period Hd-A (refer to FIG. 4C) such that the image signal output unit 23 outputs the image signal D[m], and an invalid horizontal scan period Hd-D (refer to FIG. 4D) such that the image signal output unit 23 outputs an invalid signal Dmy[m] instead of the image signal D[m].

FIG. 4C illustrates a case where the horizontal scan period Hd is the valid horizontal scan period Hd-A. As illustrated in the drawing, in the case where the horizontal scan period Hd is the valid horizontal scan period Hd-A, the enable signal DEnb is active (high level in an example of the drawing) in the horizontal valid data period DHI. Furthermore, in the horizontal valid data period DHI in which the enable signal DEnb is active, the image signal D[m] (image signal DGB[m]) is output from the image signal output unit 23. In contrast, the enable signal DEnb is inactive in the periods (the horizontal synchronization period DHp, the horizontal back porch period DHb, and the horizontal front porch period DHf) other than the horizontal valid data period DHI of the valid horizontal scan period Hd-A. The image signal output unit 23 stops output of the image signal D[m] (image signal DGB[m]) for respective pixels of the line data in the periods other than the horizontal valid data period DHI in which the enable signal DEnb is inactive in the valid horizontal scan period Hd-A, and outputs an invalid line signal DGB-dmy.

The above-described third condition is satisfied in such a way that the timing generator 32 causes the enable signal DEnb to be active in the horizontal valid data period DHI. That is, the timing control unit 30, which includes the output control unit 31 and the timing generator 32, outputs the line data of the image signal D[m] (image signal DGB[m]) corresponding to the display target line for respective pixels from the image signal output unit 23 in timing in which all of the above-described first to third conditions are satisfied.

FIG. 4D illustrates a case where the horizontal scan period Hd is the invalid horizontal scan period Hd-D. As illustrated in the drawing, the enable signal DEnb becomes inactive in the horizontal valid data period DHI in a case where the horizontal scan period Hd is the invalid horizontal scan period Hd-D. Furthermore, the image signal output unit 23 outputs the invalid signal Dmy instead of the image signal D[m] (image signal DGB[m]) in the horizontal valid data period DHI of the invalid horizontal scan period Hd-D. In contrast, the enable signal DEnb becomes inactive in the periods (the horizontal synchronization period DHp, the horizontal back porch period DHb, and the horizontal front porch period DHf) other than the horizontal valid data period DHI of the invalid horizontal scan period Hd-D. The image signal output unit 23 stops output of the image signal D[m] (image signal DGB[m]) and outputs the invalid line signal DGB-dmy in the periods other than the horizontal valid data period DHI of the invalid horizontal scan period Hd-D.

Meanwhile, the timing generator 32 determines whether the horizontal scan period Hd is set to the valid horizontal scan period Hd-A or the invalid horizontal scan period Hd-D, in other words, determines whether or not to cause the enable signal DEnb to be active in the horizontal valid data period DHI based on the output control signal CTR that is output by the output control unit 31. A relationship between types of the output control signal CTR, the enable signal DEnb, and the horizontal scan period Hd will be described later.

Figure 5:
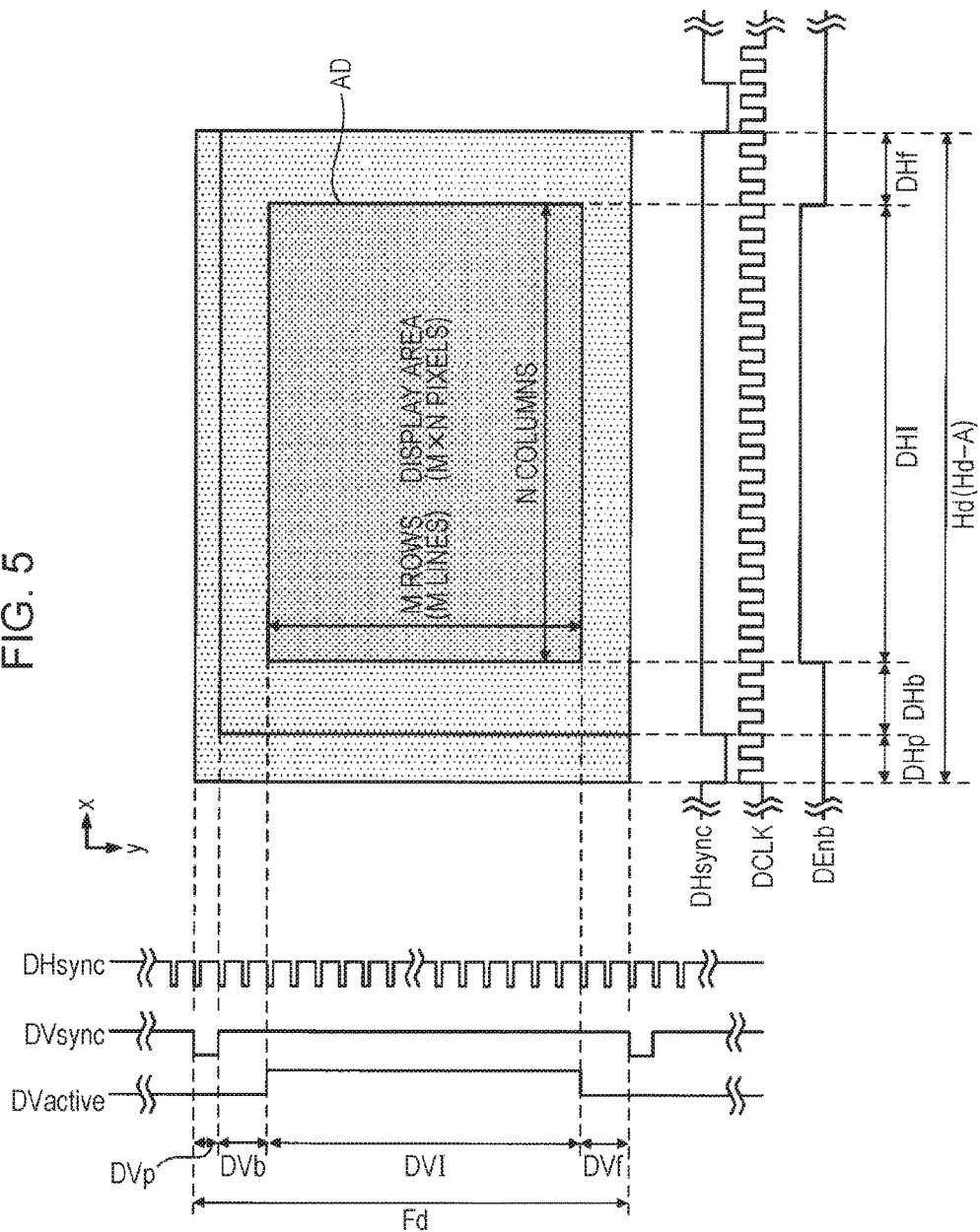
FIG. 5 is an explanatory diagram illustrating the display area AD and a timing chart for displaying the display area AD on a display unit.

FIG. 5 is an explanatory diagram illustrating a relationship between various signals, which are generated by the timing generator 32, and timing in which images are displayed in the display area AD of the liquid crystal panel 42.

As illustrated in the drawing, the pixels in M rows×N columns leading from a first row line to an M-th row line included in the display area AD display images corresponding to one screen which is indicated by the image signals D[1] to D[M] in the vertical valid data period DVI, in which the vertical valid data signal DVactive becomes active, of the display vertical scan period Fd.

In addition, N pixels, which form an m-th row line of the display area AD, display images for respective pixels of the line data indicated by the image signal D[m] in the horizontal valid data period DHI, in which the enable signal DEnb becomes active, of the horizontal scan period Hd (valid horizontal scan period Hd-A).

Meanwhile, the vertical valid data period DVI is extended according to the number of the invalid horizontal scan periods Hd-D included in the vertical valid data period DVI. However, in the drawing, a case is assumed where all of the horizontal scan periods Hd, which are included in the vertical valid data period DVI, are the valid horizontal scan periods Hd-A.

Figure 6:
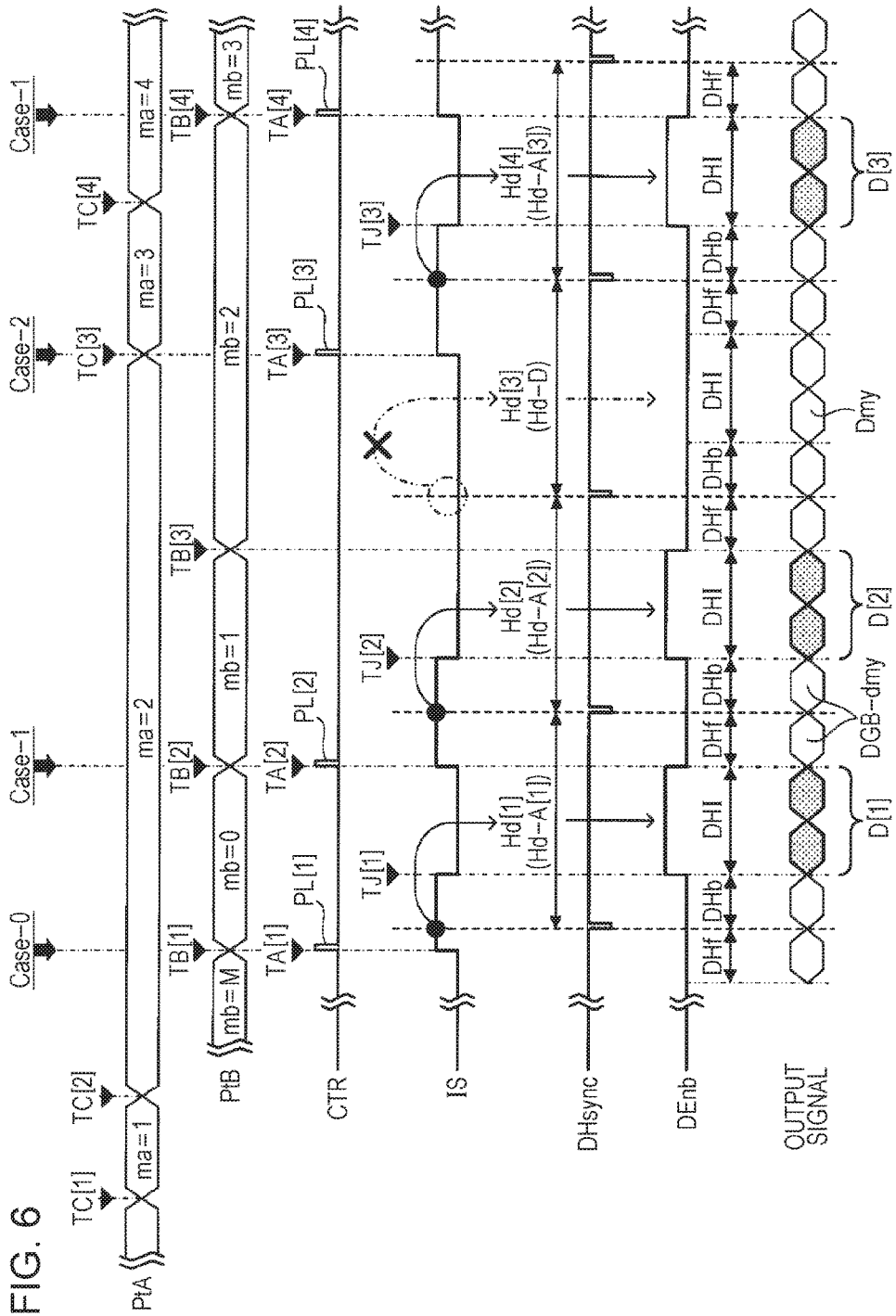
FIG. 6 is a timing chart illustrating the operation of the imaging display apparatus 1.

FIG. 6 is an explanatory diagram illustrating the output control signal CTR and the enable signal DEnb.

As described above, in a case where it is determined that the preparation for the output of the image signal D[m] is completed, that is, in a case where the first condition and the second condition are satisfied, the output control unit 31 sets the output control signal CTR to a value CTR[m] which indicates that the results of the determinations are positive. Here, for convenience, in the embodiment, it is assumed that, in a case where it is determined that the preparation for the output of the image signal D[m] is completed, the output control unit 31 outputs a pulse waveform which temporarily rises to the high level as the output control signal CTR, and an output pulse waveform, which indicates the results of the determinations in which the preparation for the output of the image signal D[m] to be set to the output control signal CTR is completed, is referred to as an output permission pulse PL[m] (=CTR[m]), as illustrated in FIG. 6.

As described above, the output control unit 31 according to the embodiment considers that the second condition is satisfied based on the fact that the output completion signal PtB is output from the image signal output unit 23. Furthermore, the output control unit 31 determines whether or not the preparation for the output of the image signal D[m] is completed by performing determination (first determination) of whether or not the image process of the image signal D[m] is completed (whether or not the first condition is satisfied) in a case where the output completion signal PtB is output.

As illustrated in FIG. 6, in a case where the output control unit 31 determines whether or not the preparation for the output of the image signal D[m] is completed, timing in which the output control unit 31 determines that the image process of the image signal D[m] is completed (determines that the first condition is satisfied), that is, timing in which the result of the first determination is positive, is referred to as image process determination time TA[m].

In addition, timing in which the output completion signal PtB is supplied to the output control unit 31 (considering that the second condition is satisfied) is referred to as display preparation determination time TB[m].

In addition, hereinafter, for convenience of explanation, time in which generation of the image signal D[m] is actually completed by the image processing unit 21 is defined as image signal generation time TC[m]. That is, the image signal generation time TC[m] is approximately the same time as time in which the image processing unit 21 outputs the write completion signal PtA.

The display preparation determination time TB[m] is approximately the same time as time in which the output of the image signal D[m−1] from the output control unit 31 is completed, and is approximately the same time as time in which the horizontal valid data period DHI of the valid horizontal scan period Hd-A (referred to as a valid horizontal scan period Hd-A[m−1]), in which the image signal D[m−1] is output, ends.

Meanwhile, in the specification "approximately the same time" is a concept which includes, in a case where a time lag caused by transmission and reception of signals and a time lag caused by various processes exist, a case where it is possible to consider as the same time in a case where the time lags are ignored.

In a case where the generation of the image signal D[m](image signal DGA[m]) is completed until the display preparation determination time TB[m] is completed, that is, the image signal generation time TC[m] elapses until the display preparation determination time TB[m] (referred to as Case-1), the image process determination time TA[m] becomes approximately the same time as the display preparation determination time TB[m].

Meanwhile, in the Case-1, in timing of the display preparation determination time TB[m] (=timing in which it is considered that the second condition is satisfied), the output control unit 31 determines that m satisfies "m≤ma" based on the line number ma which indicates the write completion signal PtA that is supplied to the output control unit 31 until the display preparation determination time TB[m], and the determined timing is the image process determination time TA[m]. Therefore, although the time lags actually exist between the image process determination time TA[m] and the display preparation determination time TB[m], hereinafter, it is considered that both times are approximately the same for simplification.

In contrast, the image process determination time TA[m] becomes time in which the image processing unit 21 completes the generation of the image signal D[m] (that is, approximately the same time as the image signal generation time TC[m]) in a case where the generation of the image signal D[m] (image signal DGA[m]) is not completed until the display preparation determination time TB[m] (that is, the image signal generation time TC[m] does not come until the display preparation determination time TB[m] (referred to as Case-2)).

Meanwhile, in the Case-2, timing, in which it is determined that, after the image processing unit 21 completes the generation of the image signal D[m] in the image signal generation time TC[m], the image processing unit 21 outputs the write completion signal PtA and the output control unit 31, which receives the supplies of the write completion signal PtA, determines that "m≤ma" is satisfied, is the image process determination time TA[m]. Therefore, although the time lags exist between the image process determination time TA[m] and the image signal generation time TC[m], hereinafter, it is considered that both times are approximately the same for simplification.

As described above, there may be the Case-1 and the Case-2. In a case where both the cases are taken together, the output control unit 31 sets the output permission pulse PL[m] to the output control signal CTR in time which is later between the image signal generation time TC[m] and the display preparation determination time TB[m] (that is, the time is the image process determination time TA[m]). That is, the output permission pulse PL[m] is output in a case where the first condition and the second condition are satisfied for the image signal D[m]. Furthermore, in a case where the third condition is satisfied after the output permission pulse PL[m] is output, in other words, the enable signal DEnb initially becomes active after the output permission pulse PL[m] is output, the timing generator 32 performs control such that the image signal D[m] is output from the image signal output unit 23.

Hereinafter, for convenience of explanation, the time, in which all of the first to third conditions for the image signal D[m] are satisfied, is referred to as an output condition satisfied time TJ[m].

In the embodiment, the timing generator 32 determines a level of an internal process signal IS to be used in an internal process of the timing generator 32 based on the output control signal CTR. Furthermore, the timing generator 32 determines timing in which the enable signal DEnb is active based on the internal process signal IS, and a type of the horizontal scan period Hd (the valid horizontal scan period Hd-A or the invalid horizontal scan period Hd-D).

Specifically, as illustrated in FIG. 6, in a case where the output permission pulse PL[m] is set to the output control signal CTR, the timing generator 32 causes the internal process signal IS to be active (high level in the example of the drawing).

In a case where the internal process signal IS is active in timing in which the horizontal scan period Hd starts, the timing generator 32 determines (classifies) the type of the horizontal scan period Hd as a valid horizontal scan period Hd-A[m], and causes the enable signal DEnb to be active in timing in which the horizontal valid data period DHI of the valid horizontal scan period Hd-A[m] starts. The timing, in which the enable signal DEnb becomes active, corresponds to the output condition satisfied time TJ[m].

Furthermore, the timing generator 32 causes the internal process signal IS to be inactive in timing in which the horizontal valid data period DHI of the valid horizontal scan period Hd-A[m] starts and the enable signal DEnb becomes active, that is, in the output condition satisfied time TJ[m].

In contrast, in a case where the internal process signal IS becomes inactive in the timing in which the horizontal scan period Hd starts, the timing generator 32 determines (classifies) the type of the horizontal scan period Hd as the invalid horizontal scan period Hd-D, and causes the enable signal DEnb to be inactive during the invalid horizontal scan period Hd-D.

Here, in the example illustrated in FIG. 6, before a display preparation determination time TB[1], mb of the PtB signal maintains that mb=M immediately after the final line of one frame is output. Furthermore, at a certain point of time after the vertical back porch period is completed after the vertical synchronization signal is output, it is possible to output data of a subsequent frame. Therefore, at a point of time of the display preparation determination time TB[1], an mb signal is reset such that mb=0 (Case-0). The Case-0 is special timing for starting display of a first one line of one frame, and exists only one time in one frame. Furthermore, as a result, the horizontal valid data period DHI of a horizontal scan period Hd[2] starts.

Subsequently, an example subsequent to a second line will be described. Hereinafter, in the example illustrated in FIG. 6, a case where the output control unit 31 determines whether or not preparation for an output of the image signal D[2] is completed and an output permission pulse PL[2] is set to the output control signal CTR (corresponding to the Case-1) will be described.

In the example illustrated in FIG. 6, the display preparation determination time TB[2] is the time in which the horizontal valid data period DHI of the horizontal scan period Hd[1] (valid horizontal scan period Hd-A[1]), in which the output of the image signal D[1] is completed, ends. In addition, in the example, a case is assumed where the image signal generation time TC[2] in which the image process of the image signal D[2] is completed arrives in advance to the display preparation determination time TB[2]. Accordingly, in the example, the image process determination time TA[2] is approximately the same time as the display preparation determination time TB[2]. Therefore, in a case where the horizontal valid data period DHI of the horizontal scan period Hd[1] ends, that is, in the display preparation determination time TB[2], the output control unit 31 outputs the output permission pulse PL[2] as the output control signal CTR.

The timing generator 32 causes the internal process signal IS to be active in timing in which the output permission pulse PL[2] is output as the output control signal CTR, that is, timing in which the horizontal valid data period DHI of the horizontal scan period Hd[1] ends. In this case, the internal process signal IS becomes active even in the time in which the horizontal scan period Hd[2] starts. Here, the timing generator 32 determines whether to set the horizontal scan period to the valid horizontal scan period Hd-A[m] or the invalid horizontal scan period Hd-D based on a state of the internal process signal IS in timing (DHsync pulse) in which the horizontal scan period starts. In the above case, the internal process signal IS is active. Therefore, the timing generator 32 sets the horizontal scan period Hd[2] to the valid horizontal scan period Hd-A[2], and causes the enable signal DEnb to be active in the horizontal valid data period DHI of the horizontal scan period Hd[2].

That is, the time in which the horizontal valid data period DHI of the horizontal scan period Hd[2] starts becomes an output condition satisfied time TJ[2] in which all of the first to third conditions for the image signal D[2] are satisfied. Therefore, in the horizontal scan period Hd[2], the image signal D[2] is output. In addition, the timing generator 32 causes the internal process signal IS to be inactive in timing in which the horizontal valid data period DHI of the horizontal scan period Hd[2] starts.

Subsequently, in the example illustrated in FIG. 6, a case (corresponding to Case-2) in which the output control unit 31 determines whether or not preparation for an output of the image signal D[3] is completed and an output permission pulse PL[3] is set to the output control signal CTR will be described.

In the example illustrated in FIG. 6, display preparation determination time TB[3] is the time in which the horizontal valid data period DHI of the horizontal scan period Hd[2] (valid horizontal scan period Hd-A[2]), in which the output of the image signal D[2] is completed, ends. In the example, a case is assumed where image signal generation time TC[3], in which the image process of the image signal D[3] is completed, is later than the display preparation determination time TB[3]. Accordingly, the image process determination time TA[3] becomes time which is later than the display preparation determination time TB[3]. In addition, in the example, a case is assumed where the image signal generation time TC[3] is later than time in which the horizontal scan period Hd[3] starts. Therefore, the output control unit 31 outputs the output permission pulse PL[3] in time which is later than the time in which the horizontal scan period Hd[3] starts.

As described above, the timing generator 32 causes the internal process signal IS to be inactive in a case where the horizontal valid data period DHI of the horizontal scan period Hd[2] starts. Therefore, the internal process signal IS becomes inactive in a case where the horizontal scan period Hd[3] starts. Therefore, since the state of the internal process signal IS is inactive in the timing (DHsync pulse) in which the horizontal scan period starts, the timing generator 32 classifies the horizontal scan period Hd[3] as the invalid horizontal scan period Hd-D, and causes the enable signal DEnb to be inactive in the horizontal valid data period DHI of the horizontal scan period Hd[3]. In this case, the image signal output unit 23 outputs the invalid signal Dmy without outputting the image signal D[3] in the horizontal valid data period DHI of the horizontal scan period Hd[3].

Thereafter, the timing generator 32 causes the internal process signal IS to be active in timing in which the output permission pulse PL[3] is output as the output control signal CTR. In the example, the timing in which the output permission pulse PL[3] is output is previous to the start of a horizontal scan period Hd[4]. In this case, the internal process signal IS is active even in the time (DHsync pulse) in which the horizontal scan period Hd[4] starts. Therefore, the timing generator 32 sets the horizontal scan period Hd[4] to a valid horizontal scan period Hd-A[3], and causes the enable signal DEnb to be active in the horizontal valid data period DHI of the horizontal scan period Hd[4].

That is, a time, in which the horizontal valid data period DHI of the horizontal scan period Hd[4] starts, is an output condition satisfied time TJ[3] in which all of the first to third conditions for the image signal D[3] are satisfied. Therefore, the image signal D[3] is output in the horizontal scan period Hd[4].

Meanwhile, in the example of the drawing, the case where the output control unit 31 determines whether or not the preparation for an output of the image signal D[1] is completed and sets the output control signal CTR to an output permission pulse PL[1] and the case (Case-0) where it is determined whether or not the preparation for the output of the image signal D[1] is completed and the output control signal CTR is set to the output permission pulse PL[1] are assumed as the conditions as the Case-1.

As described above, in the embodiment, the output control unit 31 outputs the output permission pulse PL[m] in a case where the first condition and the second condition are satisfied, and causes the state of the internal process signal IS to be active. Furthermore, the output control unit 31 determines the valid horizontal scan period Hd-A[m] or the invalid horizontal scan period Hd-D[m] in the case (DHsync pulse) in which the horizontal scan period starts. In a case where the valid horizontal scan period is determined, the image signal output unit 23 performs an operation of outputting the image signal D[m] in the first horizontal scan period Hd after the output permission pulse PL[m] is output. Through the operation, timing, in which a result of the image process in a line unit D[m] performed by the image processing unit 21 is output from the image signal output unit 23 as the image signal D[m], is adjusted with a precision in units of the horizontal scan period Hd.

Meanwhile, although, in the example illustrated in FIG. 6, the timing generator 32 determines the type of the horizontal scan period Hd in the timing in which the horizontal scan period Hd starts, it is only an example. For example, the type of the horizontal scan period Hd may be determined from the start of the horizontal front porch period DHf of the horizontal scan period Hd in which the output permission pulse PL[m] is output until the end of the horizontal back porch period DHb of the first horizontal scan period Hd after the output permission pulse PL[m] is output.

In addition, although, in the example illustrated in FIG. 6, the timing in which the internal process signal IS is caused to be inactive is set to the timing in which the enable signal DEnb becomes active, it is only an example. The timing in which the timing generator 32 causes the internal process signal IS to be inactive may be included in the horizontal valid data period DHI after the enable signal DEnb becomes active until the enable signal DEnb becomes inactive.

In addition, although the timing generator 32 determines the waveform of the enable signal DEnb and the type of the horizontal scan period Hd using the internal process signal IS in the embodiment, it is only an example. The timing generator 32 may determine the waveform of the enable signal DEnb and the type of the horizontal scan period Hd based on the output control signal CTR without using the internal process signal IS.

In addition, although, in the embodiment, the output control signal CTR includes the waveform which has the output permission pulse PL[m], it is an example. The output control signal CTR may include, for example, the waveform of the internal process signal IS illustrated in FIG. 6. In this case, the timing generator 32 may supply various signals, such as the enable signal DEnb, which are necessary for the output control unit 31 to determine the waveform of the output control signal CTR, to the output control unit 31.

Figure 7A:
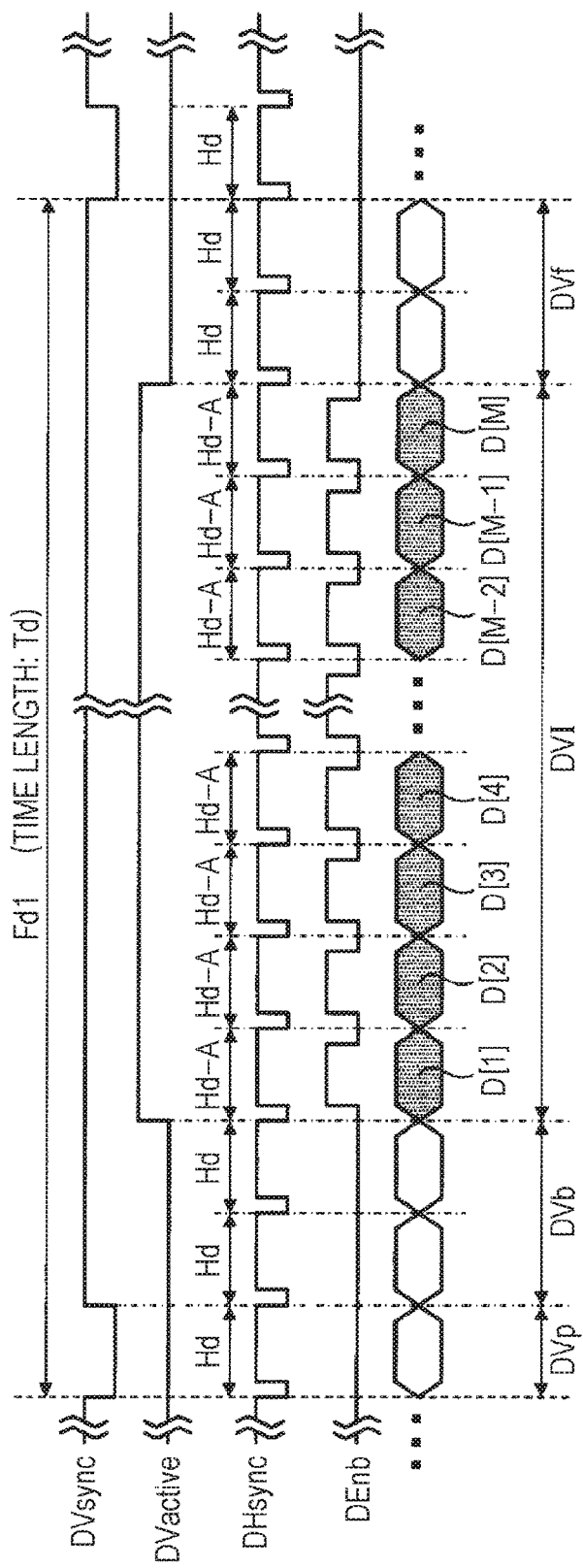
FIG. 7A is a timing chart illustrating the operation of the imaging display apparatus 1.
Figure 7B:
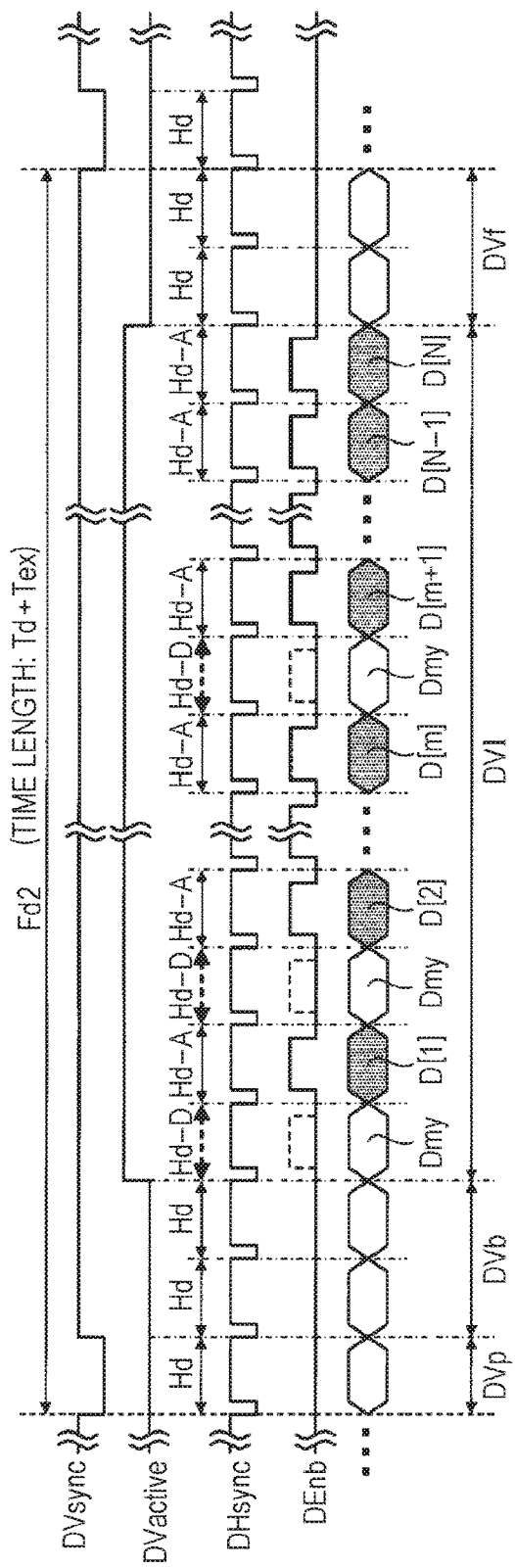
FIG. 7B is a timing chart illustrating the operation of the imaging display apparatus 1.

FIGS. 7A and 7B are explanatory diagrams illustrating a relationship between the valid horizontal scan period Hd-A, the invalid horizontal scan period Hd-D, and the display vertical scan period Fd.

The display vertical scan period Fd is a period in which the image signals D[1] to D[M] corresponding to M-row lines are output. Therefore, the timing generator 32 provides M valid horizontal scan periods Hd-A in the vertical valid data period DVI of each display vertical scan period Fd.

In contrast, the timing generator 32 according to the embodiment classifies the horizontal scan period Hd as any one of the valid horizontal scan period Hd-A and the invalid horizontal scan period Hd-D. Furthermore, only in a case where the horizontal scan period Hd is the valid horizontal scan period Hd-A, the image signal D[m] is output in the horizontal scan period Hd.

Therefore, in a case where the invalid horizontal scan period Hd-D is provided in the vertical valid data period DVI of the display vertical scan period Fd, the timing generator 32 according to the embodiment extends the vertical valid data period DVI by the time length corresponding to the invalid horizontal scan period Hd-D, and outputs the display vertical synchronization signal DVsync and the vertical valid data signal DVactive such that M valid horizontal scan periods Hd-A are provided in the vertical valid data period DVI of each display vertical scan period Fd.

For example, similarly to the display vertical scan period Fd1 illustrated in FIG. 7A, in a case where all of the horizontal scan periods Hd of the vertical valid data period DVI are set to the valid horizontal scan periods Hd-A, the timing generator 32 causes the time length of the vertical valid data period DVI to be M times larger than the time length of the horizontal scan period Hd. Here, in the display vertical scan period Fd1, a period other than the vertical synchronization front porch period (DVf), the vertical synchronization period (DVp), and the vertical synchronization back porch period (DVb), that is, DVI is referred to as the vertical valid data period DVI, thereby realizing a period DVactive=H.

In contrast, similarly to the display vertical scan period Fd2 illustrated in FIG. 7B, in a case where one or more invalid horizontal scan periods Hd-D are provided in the vertical valid data period DVI, the timing generator 32 causes the time length of the vertical valid data period DVI (the period in which DVactive=H) to be a time length acquired by adding a time length which is M times larger than the horizontal scan period Hd to a time length corresponding to the sum of one or more invalid horizontal scan periods Hd-D which exist in the vertical valid data period DVI.

That is, the timing generator 32 enables the image signal output unit 23 to output the image signals D[1] to D[M] in each display vertical scan period Fd by adjusting the time length of the display vertical scan period Fd in units of the horizontal scan period Hd.

Meanwhile, similarly to the display vertical scan period Fd1 illustrated in FIG. 7A, in a case where all of the horizontal scan periods Hd of the vertical valid data period DVI are the valid horizontal scan period Hd-A, the time length of the display vertical scan period Fd is referred to as a standard vertical scan time Td.

In addition, similarly to the display vertical scan period Fd2 illustrated in FIG. 7B, in a case where one or more invalid horizontal scan periods Hd-D are provided in the vertical valid data period DVI, the total value of the time lengths of one or more invalid horizontal scan periods Hd-D is referred to as extended vertical scan time Tex. That is, the time length of the vertical valid data period DVI or the time length of the display vertical scan period Fd in the case where one or more invalid horizontal scan periods Hd-D are provided is the sum of the standard vertical scan time Td and the extended vertical scan time Tex.

Subsequently, the display unit 40 will be described with reference to FIG. 8.

Figure 8:
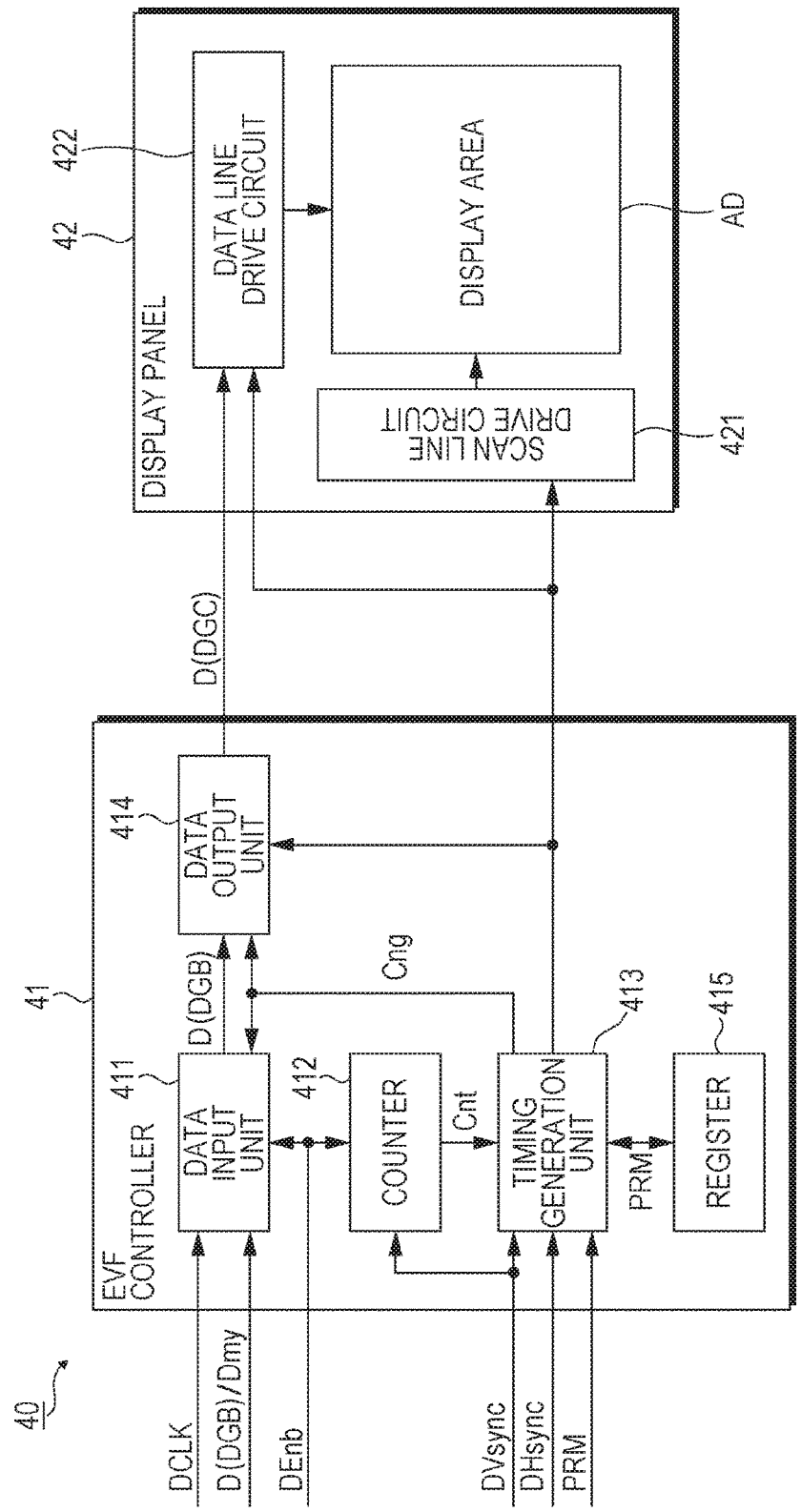
FIG. 8 is a block diagram illustrating a configuration of a display unit 40.

FIG. 8 is a block diagram illustrating a configuration of the display unit 40. As described above, the display unit 40 includes the EVF controller 41 that controls the operation of the liquid crystal panel 42, and the liquid crystal panel 42 that displays an image according to the image signal D.

As described above, in the liquid crystal panel 42, the display area AD is provided to display the image according to the image signal D. The display area AD is formed to include M-row scan lines that extend in the X axis direction in FIG. 5, N-column data lines that extend in the Y axis direction, and the pixels in M rows×N columns that are provided to correspond to the intersections of scan lines and data lines. In addition, the liquid crystal panel 42 includes a scan line drive circuit 421 that selects the scan lines, a data line drive circuit 422 that drives the data lines, and an optical system (not illustrated in the drawing) that extends an image which is displayed in the display area AD to be capable of being observed.

The EVF controller 41 includes a data input unit 411 to which the image signals D (image signals DGB) are input from the image signal output unit 23, a counter 412 that counts the number of valid horizontal scan periods Hd-A (the number of times that the enable signal DEnb becomes active) in each vertical valid data period DVI, a timing generation unit 413 that generates various timing signals which prescribe drive timings of the liquid crystal panel 42, a data output unit 414 that outputs the image signal D (image signal DGC) to the liquid crystal panel 42, and a register 415 that stores the setting parameter PRM which prescribes the operation of the EVF controller 41.

Meanwhile, in the embodiment, data transmission between the image process circuit 100 (the image signal generation unit 20 and the timing control unit 30) and the EVF controller 41 is performed through a parallel interface (not illustrated in the drawing).

In a case where the imaging display apparatus 1 operates in the live view mode in such a way that the user of the imaging display apparatus 1 selects an operation in the live view mode using the manipulation unit 60, the setting parameter PRM is supplied to the timing generation unit 413 from the parameter transmission unit 33 before the imaging display apparatus 1 starts the operation in the live view mode. Furthermore, the timing generation unit 413 stores (sets) the transmitted setting parameter PRM in the register 415.

The setting parameter PRM, which is set to the register 415, is a value which prescribes the operation of the EVF controller 41 in order to operate the EVF controller 41 according to the specifications of the liquid crystal panel 42.

The setting parameter PRM may include, for example, the time length of the horizontal scan period Hd (or the number of clocks of the display dot clock signal DCLK included in the horizontal scan period Hd. Hereinafter, the number of clocks of the display dot clock signal DCLK is simply referred to as "the number of clocks"), the time length of the horizontal valid data period DHI (or the number (N) of pixels in the X axis direction of the display area AD), the time length of the horizontal synchronization period DHp (or the number of clocks), the time length of the horizontal back porch period DHb (or the number of clocks), the time length of the horizontal front porch period DHf (or the number of clocks), the time length of the vertical valid data period DVI in a case where the invalid horizontal scan period Hd-D is not included in the vertical valid data period DVI (or the number (M) of lines in the Y axis direction of the display area AD. That is, the number of valid horizontal scan periods Hd-A included in the vertical valid data period DVI), the time length of the vertical synchronization period DVp (or the number of clocks), the time length of the vertical back porch period DVb (or the number of clocks), the time length of the vertical front porch period DVf (or the number of clocks), and the like.

In the imaging display apparatus 1 according to the embodiment, it is possible to set timing, in which the EVF controller 41 operates according to the specifications of the liquid crystal panel 42, from the image process circuit 100, and thus it is not necessary to change the EVF controller 41 even in a case where the size of the liquid crystal panel 42 is changed or a case where the specifications of the liquid crystal panel 42, such as a frame rate, is changed. Therefore, it is possible to improve versatility of the system.

The output signal, which includes the display dot clock signal DCLK, the image signal D (image signal DGB), and the invalid signal Dmy from the image signal output unit 23, and the enable signal DEnb are supplied to the data input unit 411 from the image process circuit 100.

In a case where the enable signal DEnb becomes active, the data input unit 411 acquires the image signal D[m] corresponding to one line, which is supplied from the image signal output unit 23 in synchronization with the display dot clock signal DCLK while the enable signal DEnb is active, and outputs the acquired image signal D[m] to the data output unit 414. In contrast, in a case where the enable signal DEnb is inactive, the data input unit 411 destroys the invalid signal Dmy, which is supplied from the image signal output unit 23, without acquiring the invalid signal Dmy.

The enable signal DEnb and the display vertical synchronization signal DVsync are supplied to the counter 412 from the image process circuit 100.

The counter 412 counts a rising edge of the enable signal DEnb, and inputs a counted value Cnt, which indicates a result of the count, to the timing generation unit 413. In addition, in a case where the display vertical synchronization signal DVsync becomes active and the vertical synchronization pulse PlsV is supplied as the display vertical synchronization signal DVsync, the counter 412 resets the counted value Cnt to "0". Therefore, it is possible for the counter 412 to count the number of valid horizontal scan periods Hd-A which are included in each display vertical scan period Fd. That is, in a case where the data input unit 411 acquires the image signal D[m] that designates images to be displayed in the m-th row line, the counted value Cnt indicates a line number (m) corresponding to the image signal D[m].

The display vertical synchronization signal DVsync, the display horizontal synchronization signal DHsync, and the setting parameter PRM are supplied to the timing generation unit 413 from the image process circuit 100, and the counted value Cnt is supplied from the counter 412.

As described above, in a case where the setting parameter PRM is supplied from the image process circuit 100, the timing generation unit 413 sets the supplied setting parameter PRM to the register 415.

In a case where the counted value Cnt indicates "m", the timing generation unit 413 causes the scan line drive circuit 421 to select the m-th row line (scan line) corresponding to the counted value Cnt. In addition, in a case where the counted value Cnt indicates "m", the timing generation unit 413 causes the data output unit 414 to supply the image signal D[m] corresponding to one line acquired by the data input unit 411 to the data line drive circuit 422 as an image signal DGC[m]. In this case, the data line drive circuit 422 writes the image signal DGC[m], which is supplied from the data output unit 414, to the N pixels (m-th row line) which are provided to correspond to the m-th row scan line which is selected by the scan line drive circuit 421 through the data line. Therefore, the images of the selected line are displayed in the display area AD. Meanwhile, in the embodiment, although the image signals DGA and DGB are digital signals, the image signal DGC may be a digital signal or an analog signal.

As described above, the EVF controller 41 displays the images, which are indicated by the image signal D supplied from the image signal output unit 23, in the display area AD of the liquid crystal panel 42.

Meanwhile, in a case where it is detected that the counted value Cnt is equal to the number "M" of lines of the display area AD, which is set in the register 415, the EVF controller 41 begins preparation of a page changing process in timing in which the display horizontal synchronization signal DHsync is initially supplied after the detection, that is, timing in which the vertical front porch period DVf starts. Furthermore, after the vertical front porch period DVf starts, the timing generation unit 413 outputs a page changing process start signal Cng to the data input unit 411 and the data output unit 414 in order to instruct to perform the page changing process.

Here, the page changing process is a process for preparation for display of images in a subsequent display vertical scan period Fd, and includes, for example, a process of eliminating data stored in buffers which are included in the data input unit 411 and the data output unit 414, or the like. The page changing process starts after the vertical front porch period DVf starts. In addition, it is preferable to end the page changing process until the vertical front porch period DVf ends.

2. Image Process

Subsequently, the details of the image processing unit 21 and the image process, which is performed by the image processing unit 21, will be described with reference to FIGS. 9 to 11.

Figure 9:
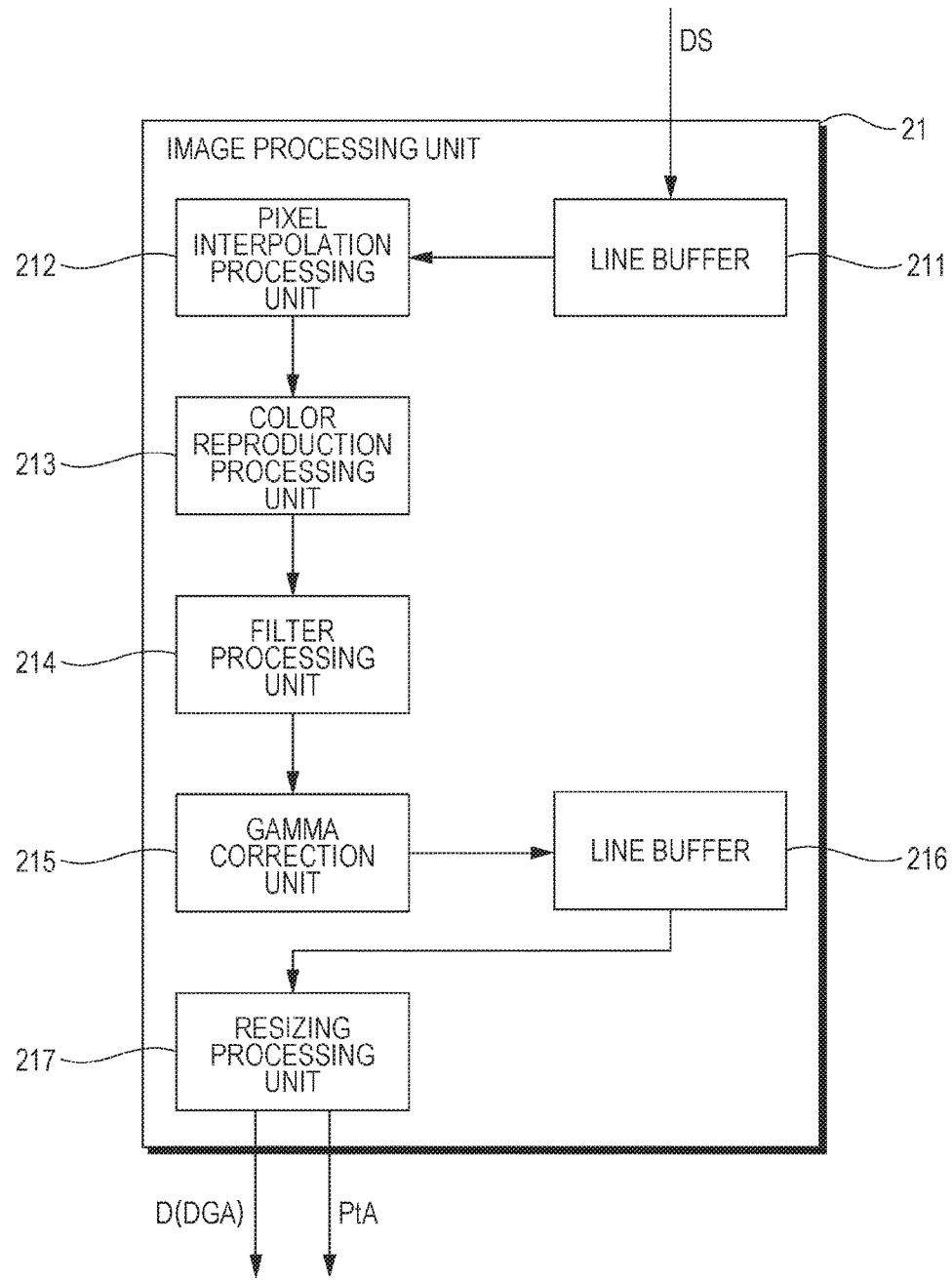
FIG. 9 is a block diagram illustrating a configuration of an image processing unit 21.

FIG. 9 is a block diagram illustrating a configuration of the image processing unit 21.

As illustrated in the drawing, the image processing unit 21 includes a line buffer 211 that temporarily stores the imaging signals DS which are output from the image sensor 12, a pixel interpolation processing unit 212 that performs interpolation process on the imaging signals DS which are stored in the line buffer 211, a color reproduction processing unit 213 that performs a color reproduction process on the imaging signals DS which are acquired through interpolation, a filtering processing unit 214 that performs a filtering process on the imaging signals DS which are acquired through the color reproduction, a gamma correction unit 215 that performs gamma correction on the imaging signals DS which are acquired through the filtering process, a line buffer 216 that temporarily stores the imaging signals DS which are acquired through the gamma correction, and a resizing processing unit 217 that performs a resizing process of converting the imaging signals DS, which is stored in the line buffer 216, into the image signals D corresponding to the number of pixels included in the display area AD.

Figure 10:
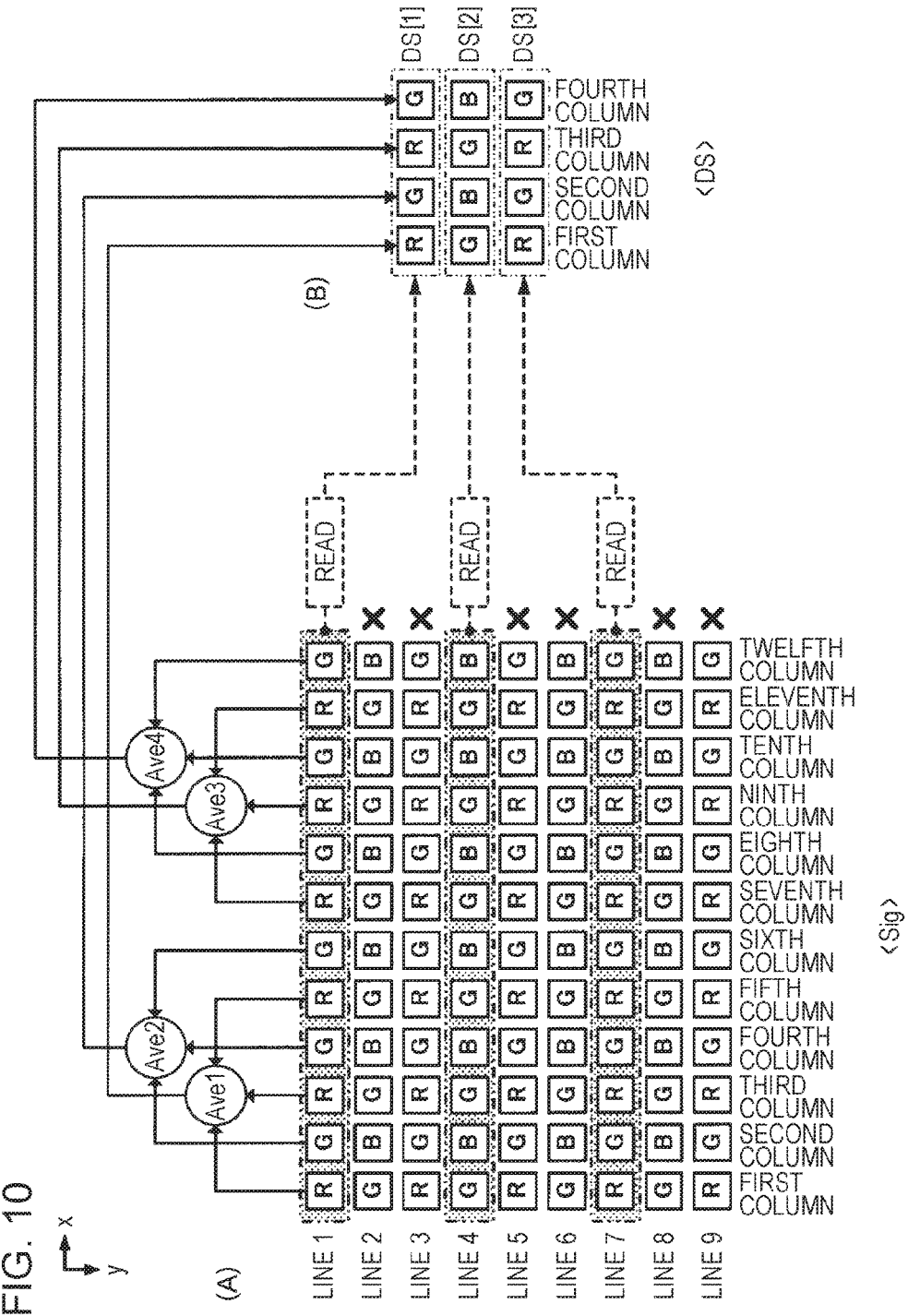
FIG. 10 is an explanatory diagram illustrating thinning reading.

FIG. 10 is an explanatory diagram illustrating a relationship between the pixel data signals Sig and the imaging signals DS which are output from the light receiving elements included in the image sensor 12. As described above, in the case where the imaging display apparatus 1 operates in the imaging mode, the image sensor 12 outputs all of the pixel data signals Sig illustrated in FIG. 10 as the imaging data for still images. In contrast, in the case where the imaging display apparatus 1 operates in the live view mode, the image sensor 12 thins out the pixel data signals Sig, and outputs the imaging signals DS illustrated in FIG. 10.

In the pixel data signals Sig illustrated in FIG. 10, each square, to which "R" is attached, indicates a pixel data signal Sig that is output from the light receiving element corresponding to a red color pixel (in order to detect red color light), each square, to which "G" is attached, indicates a pixel data signal Sig that is output from the light receiving element corresponding to a green color pixel, and each square, to which "B" is attached, indicates a pixel data signal Sig that is output from the light receiving element corresponding to a blue color pixel.

In addition, in the image signals illustrated in FIG. 10, each square, to which "R" is attached, indicates an imaging signal DS in order to generate an image signal D corresponding to a red color pixel (designating gray scale to be displayed by the red color pixel), each square, to which "G" is attached, indicates an imaging signal DS in order to generate an image signal D corresponding to a green color pixel, and each square, to which "B" is attached, indicates an imaging signal DS in order to generate an image signal D corresponding to a blue color pixel.

Meanwhile, in the embodiment, a case is assumed where the pixels of the red color, the green color, and the blue color are arranged in a Bayer method in the valid image sensor area AS of the image sensor 12.

As described above, the image sensor 12 outputs the imaging signals DS corresponding to the pixels in P rows×Q columns by performing thinning reading on the pixel data signals Sig which are output by the light receiving elements in PS rows×QS columns.

In a case of thinning reading, the image sensor 12 thins out the pixel data signals Sig, which are output by the light receiving elements in PS rows into signals corresponding to pixels in P rows in the Y axis direction.

Specifically, the image sensor 12 performs thinning out in the Y axis direction by selecting a read target line from PS rows, and reading a pixel data signal Sig which is output by a light receiving element positioned in the read target line while skipping the pixel data signals Sig that are output by light receiving elements which are positioned other than the read target line.

In the embodiment, since the arrangement of the pixels that are provided in the valid image sensor area AS of the image sensor 12 is Bayer arrangement, the read target line is determined at a ratio of odd number lines to one line.

In a case where the pixels are arranged in the Bayer method, a line, which include the red color pixel and the green color pixel, and a line, which includes the green color pixel and the blue color pixel, are alternately disposed in the Y axis direction. Therefore, it is possible to arrange the pixels acquired after reading such that the line, which include the red color pixel and the green color pixel, and the line, which includes the green color pixel and the blue color pixel, are alternately disposed in the Y axis direction by determining the read target line at the ratio of odd number lines to one line, and thus it is possible to prevent the same color pixels are adjacent to each other.

In the example illustrated in FIG. 10, in the Y axis direction, the read target line is determined at a ratio of three lines to one line. Specifically, in lines 1 to 9, the line 1, the line 4, and the line 7 are set to read target lines. In this case, as illustrated in FIG. 10, it is possible to acquire the imaging signals DS by thinning out the pixel data signals Sig to one a third in the Y axis direction.

In addition, the image sensor 12 performs an arithmetic average reading operation on the pixels in the X direction as a reduction reading process in the horizontal direction, and sets the pixel data signals Sig, which are output by the light receiving elements in QS columns, to signals (imaging signals DS) corresponding to the pixels in Q columns.

Specifically, the image sensor 12 performs grouping QS light receiving elements, which are positioned in the respective read target lines, such that a predetermined number of light receiving elements form one set, and reduces the pixel data signals Sig, which are output by the QS light receiving elements, to "one of a predetermined number" by performing an arithmetic average process after reading values indicated by the pixel data signals Sig that are output by a predetermined number of light receiving elements which form each set.

In a case where the pixels of the image sensor 12 are arranged in the Bayer method, two color pixels are alternately arranged in each line, and thus grouping is performed such that a predetermined number of light receiving elements are classified as one set in every other line in the X axis direction. Furthermore, the arithmetic average is acquired from the values, indicated by the pixel data signals Sig that are output by a predetermined number of light receiving elements, which form each set.

In the example illustrated in FIG. 10, in the X axis direction, grouping is performed in such a way that three light receiving elements in every other column are set to one set, and the arithmetic average reading is performed on the values indicated by the pixel data signals Sig that are output by the three same-colored light receiving elements which form each set. Specifically, for example, in the line 1 and the line 7, the red color pixels of a first column, a third column, and a fifth column are set to one set, the arithmetic average of the values of the pixel data signals Sig that are output by three light receiving elements corresponding to the three pixels is acquired using an adder Ave1, and the acquired average value is set to a value of the imaging signal DS corresponding to the red color pixel of the first column. In the same manner, in the line 1 and the line 7, the arithmetic average of the values of the pixel data signals Sig that are output by light receiving elements corresponding to the green color pixels in a second column, a fourth column, and a sixth column using an adder Ave2, and the acquired average value is set to a value of the imaging signal DS corresponding to the green color pixel of the second column. In this case, as illustrated in FIG. 10, it is possible to acquire the imaging signals DS in which the pixel data signals Sig are resized (reduced) to one to a third in the X axis direction.

Figure 11:
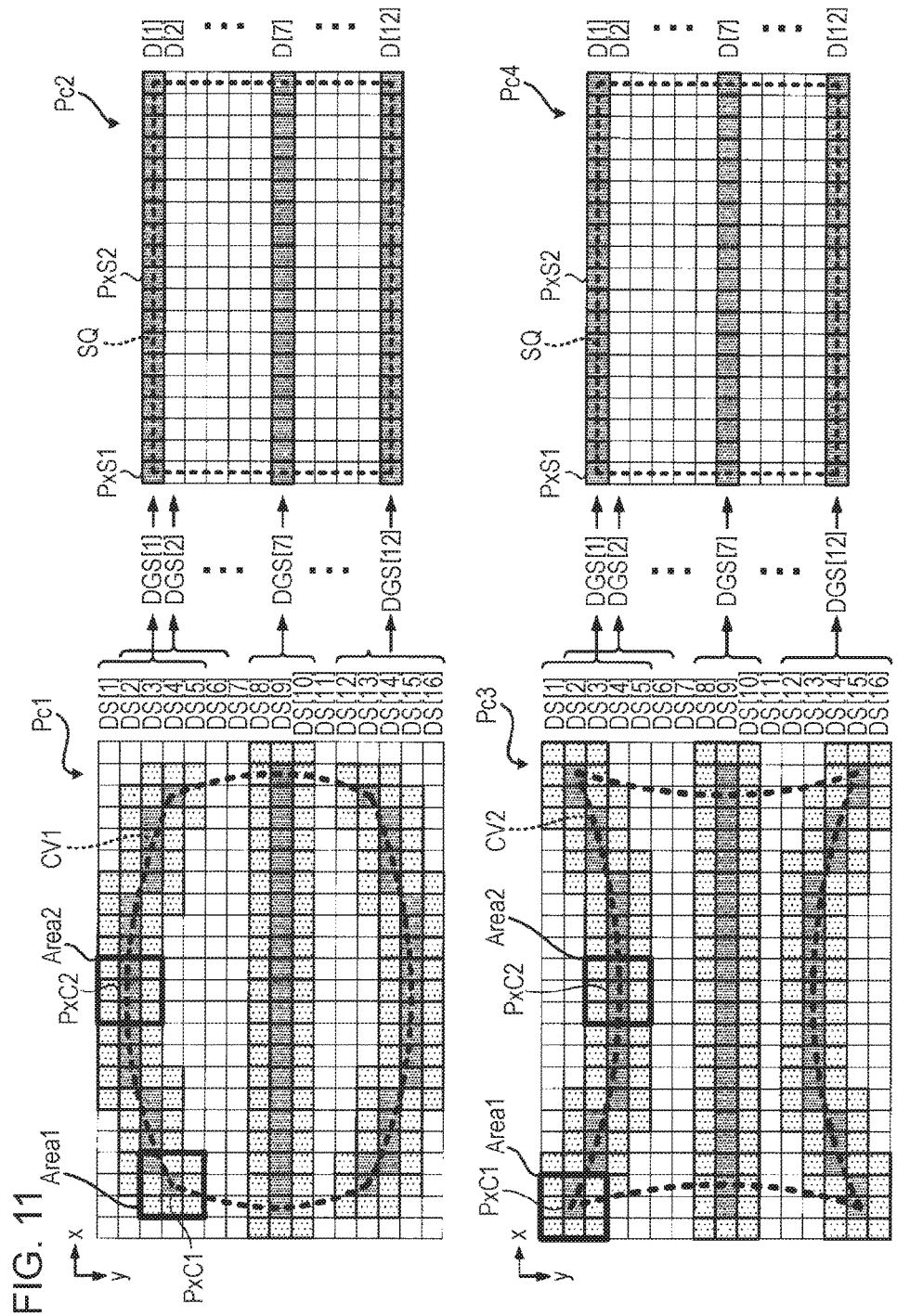
FIG. 11 is an explanatory diagram illustrating a distortion correction process.

FIG. 11 is an explanatory diagram illustrating a resizing process of generating display pixels to be displayed in the display area AD from the imaging signals DS by the resizing processing unit 217. Here, an exemplary example will be described as a resizing image process which includes a correction image process for distortion generated by imaging lenses in addition to a general longitudinal and lateral reduction and resizing conversion process.

As described above, the number of pixels of the images indicated by the imaging signals DS is different from the number of pixels (the number of pixels in the display area AD) of the images indicated by the image signals D. Therefore, the resizing processing unit 217 performs a resizing process of converting the imaging signals DS into the image signals D corresponding to the number of pixels in the display area AD. Also, the resizing processing unit 217 performs simple reduction and enlargement process in the vertical direction and the horizontal direction as the resizing image process. Since the longitudinal and lateral reduction and enlargement process is a general reduction and enlargement process, the detailed description thereof will be omitted in the exemplary example below.

Meanwhile, there is a case where the images indicated by the imaging signals DS have distortion due to optical properties of lenses included in the imaging optical system 11. Specifically, there is a case where an image indicative of a result of imaging acquired when an image of a subject is captured has barrel aberration in which the image extends toward the outside compared to an image to be originally displayed in the display area AD or a winding aberration in which the image contracts toward inside compared to the image to be originally displayed. Therefore, the resizing processing unit 217 performs a distortion correction process of correcting distortion, such as the barrel aberration and pincushion aberration, in the resizing process.

Hereinafter, the distortion correction process which is performed during the resizing process will be described with reference to FIG. 11. Meanwhile, in FIG. 11, a case is assumed where the number of lines of an image indicated by the imaging signals DS is 16 (P=16), and the number of lines of the image indicated by the image signals D is 12 (M=12).

In FIG. 11, the image indicated by the imaging signals DS is expressed by a symbol Pc1 in a case where the barrel aberration is generated, an image, which is displayed in the display area AD and is indicated by the image signals D is expressed by a symbol Pc2 in a case where an image of the subject is captured based on the imaging signals DS that indicate the image Pc1. In a case where the pincushion aberration is generated, the image indicated by the imaging signals DS is expressed by a symbol Pc3, and, in a case where an image of the subject is captured based on the imaging signals DS that indicates the image Pc3, an image, which is displayed in the display area AD and is indicated by the image signals D, is expressed by a symbol Pc4.

In the image Pc1, although an image to be displayed in the display area AD is a square SQ, the imaging signals DS indicate a closed curve CV1 in which the square SQ is extended due to the barrel aberration. In addition, in the image Pc3, although an image to be displayed in the display area AD is the square SQ, the imaging signals DS indicates a closed curve CV2 in which the square SQ is contracted due to the pincushion aberration.

In a case where the barrel aberration is generated, the resizing processing unit 217 corrects the image Pc1 indicated by the closed curve CV1 to an image Pc2 which indicates the square SQ in the distortion correction process. Similarly, in a case where the barrel aberration is generated, the resizing processing unit 217 corrects the image Pc3 indicated by the closed curve CV2 to an image Pc4 which indicates the square SQ in the distortion correction process.

In the cases, the resizing processing unit 217 associates pixels in the image acquired before the correction with pixels in the image acquired after the correction, sets the pixels, which are acquired before the correction and correspond to the pixels acquired after the correction, to central pixels, and determines gray scales used to display the pixels acquired after the correction based on gray scales to be displayed in the respective pixels in a reference area that includes the central pixels and peripheral pixels which are pixels around the central pixels.

For example, in a case where the gray scale of a pixel PxS1, which is acquired after the correction and which forms the image Pc2 or the image Pc4, is determined, the resizing processing unit 217 determines a pixel PxC1, which is acquired before the correction and which forms the image Pc1 or the image Pc3, as the central pixel. Furthermore, the resizing processing unit 217 determines gray scale to be displayed in the pixel PxS1 based on gray scales to be displayed in the respective pixels in a reference area Area1 that includes the pixel PxC1 which is the central pixel.

Similarly, in a case where the gray scale of a pixel PxS2, which forms the image Pc2 or the image Pc4 and which is acquired after the correction, is determined, the resizing processing unit 217 determines a pixel PxC2, which forms the image Pc1 or the image Pc3 and which is acquired before the correction, as the central pixel. Furthermore, the resizing processing unit 217 determines gray scale to be displayed in the pixel PxS2 based on gray scales to be displayed in the respective pixels in a reference area Area2 that includes the pixel PxC2 which is the central pixel.

Meanwhile, thickly hatched pixels in the image Pc2 and the image Pc4 indicate pixels which are acquired after the correction and are positioned in a first row, a seventh row, and a twelfth row in the image signals D. Thickly hatched pixels in the image Pc1 and the image Pc3 indicate pixels (central pixels), which are acquired before the correction and which correspond to the respective pixels acquired after the correction, and softly hatched pixels in the image Pc1 and the image Pc3 indicate the peripheral pixels corresponding to the respective central pixels.

As being understood from the example illustrated in FIG. 11, in a case where the barrel aberration is generated, the degree of extension of the image is varied due to the positions of the lines of the screen. As the positions in the vertical direction (Y axis direction) approach ends, the degree of extension of the image increases. In addition, in a case where the pincushion aberration is generated, the degree of contract of the image is varied due to the positions of the lines of the screen. As the positions in the vertical direction (Y axis direction) approach the ends, the degree of contract of the image increases.

Accordingly, the number of lines of the imaging signals DS, which is necessary in a case where the resizing processing unit 217 generates the image signal D[m], is varied according to positions (a value of m) of lines which correspond to the image signal D[m]. Therefore, a time length which is required for the resizing processing unit 217 to perform the resizing process is varied according to the positions of the lines.

Here, the imaging signal DS corresponding to a p-th row line is expressed as an imaging signal DS[p] (p is a natural number which satisfies 1≤p≤P).

At this time, for example, in the example illustrated in FIG. 11, in order for the resizing processing unit 217 to generate an image signal D[1] corresponding to a first row line, imaging signals DS[1] to DS[5] corresponding to first to fifth row lines are necessary. In contrast, in order for the resizing processing unit 217 to generate an image signal D[7] corresponding to a seventh row line, imaging signals DS[8] to DS[10] corresponding to eighth to tenth row lines are necessary. That is, a time length which is necessary for the resizing processing unit 217 to generate the image signal D[1] is longer than a time length which is necessary to generate the image signal D[7].

Hereinafter, the imaging signal DS[p] of one or more lines which are necessary to generate the image signal D[m] is referred to as an imaging signal DGS[m].

For example, in the example illustrated in FIG. 11, an imaging signal DGS[1], which is necessary to generate the image signal D[1], is an imaging signal DS[p] corresponding to five lines including imaging signals DS[1] to DS[5], an imaging signal DGS[7], which is necessary to generate the image signal D[7], is an imaging signal DS[p] corresponding to three lines including imaging signals DS[8] to DS[10], and an imaging signal DGS[12], which is necessary to generate the image signal D[12], is an imaging signal DS[p] corresponding to five lines including imaging signals DS[12] to DS[16].

As described above, the resizing processing unit 217 generates display images, which are displayed in the display area AD and which correspond to M rows×N columns, based on the image data which is indicated by the imaging signals DS and which corresponds to P rows×Q columns. Meanwhile, in a case where the resizing processing unit 217 completes the resizing process and generates the image signals D for respective lines, the resizing processing unit 217 stores the generated image signal D[m] corresponding to one line (image signal DGA[m]) in the line buffer 22, and outputs the write completion signal PtA which indicates that the image signal D[m] is completely stored in the line buffer 22.

3. Output of Image Signal

Subsequently, a relationship between timing in which the imaging signal DS[p] is output from the imaging unit 10 and timing in which the image signal D[m] is output from the image signal generation unit 20 will be described.

Figure 12:
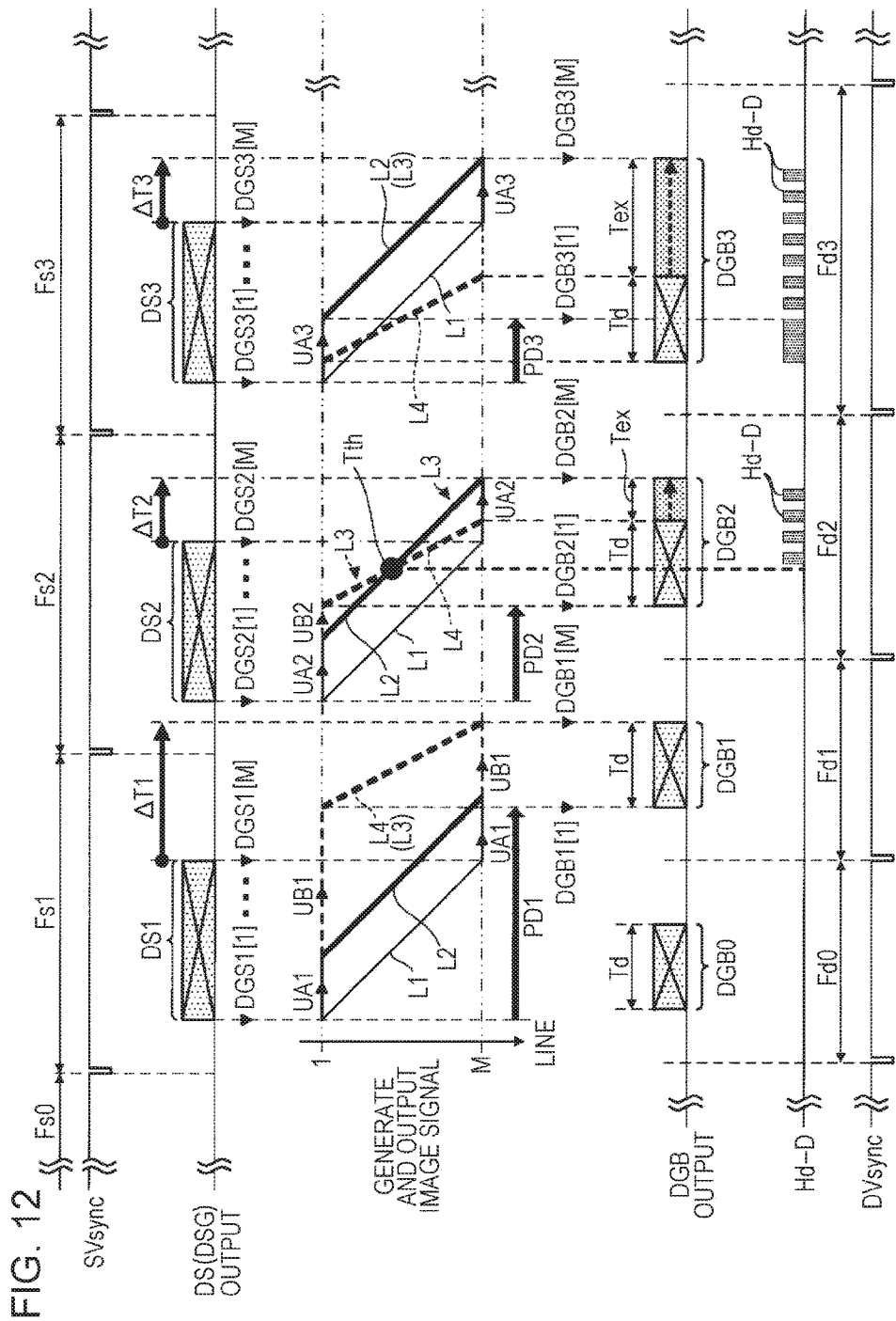
FIG. 12 is a timing chart illustrating the operation of the imaging display apparatus 1.

FIG. 12 is a timing chart schematically illustrating a relationship between timing in which the imaging unit 10 outputs the imaging signals DS (DS[1] to DS[P]) in the respective imaging vertical scan periods Fs1 to Fs3 of a plurality of sequent imaging vertical scan periods Fs (Fs0 to Fs3), timing in which the image processing unit 21 generates the image signals D (D[1] to D[M]), that is, the image signals DGA (DGA[1] to DGA[M]) based on the imaging signals DS and stores the generated image signals DGA in the line buffer 22, and timing in which the image signal output unit 23 acquires the image signals D, that is, the image signals DGB (DGB[1] to DGB[M]) from the line buffer 22 and outputs the acquired signals to the display unit 40 in the respective display vertical scan periods Fd1 to Fd3 of the plurality of sequent display vertical scan periods Fd (Fd0 to Fd3).

Meanwhile, a period, in which the imaging signal DS is output, of the imaging vertical scan periods Fs, is referred to as a "frame of the imaging signal DS". In addition, a vertical valid data period DVI corresponding to a period, in which the image signal D is output, of the display vertical scan periods Fd is referred to as a "frame of the image signal D". Furthermore, as illustrated in FIG. 12, time from start of the frame of the imaging signal DS until start of the image signal D is referred to as a phase difference PD.

In FIG. 12, for convenience of explanation, there is a case where the image signals DS[p], which are output in the imaging vertical scan periods Fs0 to Fs3, are separately realized as the imaging signals DS0[p] to DS3[p], respectively.

In addition, as illustrated in FIG. 11, from the viewpoint that the image signals D[1] to D[M] are generated in the image processing unit 21, the imaging signals DS[1] to DS[P], which are output from the imaging unit 10, are the imaging signals DGS[1] to DGS[M]. Hereinafter, for convenience of explanation, there is a case where the imaging signals DGS[m], which are output in the imaging vertical scan periods Fs0 to Fs3, are separately realized as imaging signals DGS0[m] to DGS3[m], respectively.

similarly, there is a case where the image signals D[m] (DGA[m] and DGA[m]), which are generated based on the imaging signals DGS0[m] to DGS3[m], are separately realized as image signals D0[m] to D3[m] (DGA0[m] to DGA3[m] and DGB0[m] to DGB3[m]), respectively.

As described above, the imaging unit 10 sequentially outputs the imaging signals DS[1] to DS[P] in units of a line for each horizontal imaging synchronization signal SHsync. In addition, in a case where the supply of the imaging signals DS[p] corresponding to the imaging signal DGSs[m] starts, the image processing unit 21 starts an image process in order to generate the image signals DGA[m]. That is, timing, in which the image processing unit 21 starts the image process in order to generate the image signals DGA[m], in the vertical synchronization period becomes different according to process line positions of DGA[m] which is generated.

In FIG. 12, input timing, in which the imaging unit 10 supplies the imaging signals DGS[1] to DGS[M] to the image processing unit 21 in units of one line, is expressed by a line L1. That is, a form in a time direction (timing), in which the image processing unit 21 sequentially starts the image process in order to generate the respective image signals DGA[1] to DGA[M], is expressed by the line L1.

In addition, a form in a time direction (timing), in which the image processing unit 21 completes the generation of the image signals DGA[1] to DGA[M] and sequentially stores the image signals DGA[1] to DGA[M] in the line buffer 22 for each line, is expressed by a line L2. After the generation of the image signals DGA[m] is completed, the image signal output unit 23 outputs the image signals DGB[m]. Accordingly, there is not a case where the image signals DGB[m] are output in time previous to time indicated by the line L2. Meanwhile, the line L2 is a line which binds the image signal generation time TC[1] to TC[M] described with reference to FIG. 6.

In addition, in a case where the image signal output unit 23 supplies the image signals DGB[1] to DGB[M] at ideal timing for the display unit 40, that is, in a case where the image signal output unit 23 supplies the image signals DGB[1] to DGB[M] such that the display unit 40 performs display at the highest frame rate (a frame rate in a case where the time length of the display vertical scan period Fd is the standard vertical scan time Td) which can be displayed, timing, in which the image signal output unit 23 sequentially reads the image signals DGB[1] to DGB[M] for each line and outputs the image signals DGB[1] to DGB[M], is expressed by a line L3. That is, the line L3 is a line that indicates timing, in a case where it is assumed that the image signal output unit 23 outputs the image signals D corresponding to one line GB[m] for each horizontal scan period Hd in which the display unit 40 is capable of displaying images corresponding to one line, the display unit 40 reads and displays images indicated by the image signals DGB[1] to DGB[M] for each horizontal scan period Hd in order of a line. The line L3 has an inclination in which one line increases for each horizontal scan period Hd. That is, the line L3 is acquired by assuming a case where all of the horizontal scan periods Hd included in the vertical valid data period DVI correspond to the valid horizontal scan periods Hd-A, and does not always consistent with the display preparation determination time TB[m] indicative of time, in which the image signals D[m] are output on the premise that the output of the image signal D[m−1] in the m−1-th row is completed (the second condition is satisfied), while supposing that the invalid horizontal scan period Hd-D is included in the vertical valid data period DVI.

The image signal output unit 23 outputs the image signals DGB[m] in a case where the display unit 40 is capable of performing display. Accordingly, the image signals DGB[m] are not read and output in time previous to the time indicated by the line L3.

In addition, in FIG. 12, time, which is necessary for the image process of generating the image signals DGA[m] for each line, is assumed as image process time UA. Hereinafter, for convenience of explanation, there is a case where the image process time UA corresponding to the respective image signals DGA0[m] to DGA3[m] is separately realized as image process time UA0 to UA3.

In addition, in FIG. 12, time after the image signals DGA[m] are stored in the line buffer 22 until the image signals DGA[m] are output to the display unit 40 by the image signal output unit 23 is assumed as waiting time UB. Hereinafter, for convenience of explanation, there is a case where the waiting time UB corresponding to the respective image signals DGB1[m] to DGB3[m] is separately realized as the waiting time UB1 to UB3.

As described above, there are cases where the imaging signals DS[1] to DS[P] do not realize one-to-one correspondence with the imaging signals DGS[1] to DGS[M], and a starting interval of the image process of generating the image signals D[m] corresponding to the respective lines is varied. Therefore, although the line L1 normally becomes a polygonal line instead of a straight line, the line L1 is drawn as a straight line for convenience for illustration in FIG. 12.

In addition, as described above, there is a case where the number of lines of the imaging signals DS[p], included in each of the imaging signals DGS[1] to DGS[M], varies according to the positions of the lines. That is, as illustrated in FIG. 11, there is a case where the image processing unit 21 generates the image signals DGA[m] based on the imaging signals DGS[m] which include the imaging signals DS[p] corresponding to three lines, and there is a case where the image processing unit 21 generates the image signals DGA[m] based on the imaging signals DGS[m] which include the imaging signals DS[p] corresponding to five lines. In the latter case, the image process time UA becomes long compared to the former case. That is, the image process time UA, in which the image processing unit 21 generates the image signals DGA[1] to DGA[M], is normally varied according to the positions of the lines. Therefore, although the line L2 normally becomes a polygonal line instead of a straight line, the line L2 is drawn as a straight line for convenience for illustration in FIG. 12.

As illustrated in FIG. 12, the line L2 indicative of the time, in which the image processing unit 21 generates an image signal D1[m] (DGA1[m]) based on an imaging signal DS1[p] (DGS1[m]) that is output from the imaging unit 10 in the imaging vertical scan period Fs1, timely precedes a line L4 (a virtual timing which is different from the definition of the above-described line L3 is described as the line L4) indicative of a past time in which it is possible for the display unit 40 to display an image indicated by the image signal D1[m] (DGA1[m]) in the display vertical scan period Fd1. As described above, a state in which the line L2 timely precedes the line L3 (line L4) is referred to as a "first state".

That is, the first state is a state in which preparation for display of an image indicated by the image signals D[m] are not enabled in the display unit 40 in a case where the image processing unit 21 generates the image signals D[m] based on the imaging signals DS[p]. Here, the case where the preparation for display of the image indicated by the image signals D[m] are not enabled in the display unit 40 includes, for example, a case where the display unit 40 is displaying an image indicated by the image signal D0 to be displayed by the display unit 40 previous to the image signal D1 when the image signal D1[m] is generated, and it is difficult for the display unit 40 to display the image indicated by the image signal D1[m].

That is, in the first state, the preparation for display of the image signals D[m] on a side of the display unit 40 is inadequate even though the image processing unit 21 generates the image signals D[m], and thus there is a case where the display of the image in the display unit 40 is delayed because the preparation for display on the side of the display unit 40 becomes a bottle neck, thereby causing a state which is delayed. In other words, the first state is a state in which it is possible to rapidly display the image signals D[m] without delays in timing in which the display unit 40 is capable of displaying the image signals D[m].

However, since time (cycle) which is necessary to display one screen by the display unit 40 is shorter than time (cycle) which is necessary to image one screen by the imaging unit 10, the delays of display in which the preparation for display on the side of the display unit 40 becomes the bottleneck are gradually reduced and resolved.

In FIG. 12, for convenience of illustration, only one set of vertical scan period including one imaging vertical scan period Fs (Fs1) and one display vertical scan period Fd (Fd1) is described as the first state. However, actually, there is a case where plural sets of vertical scan periods exist. In this case, in the first state, a phase difference PD1 (a symbol PD1 as illustrated in FIG. 12 is attached as the phase difference PD in the first state) becomes short by time corresponding to a difference between the display vertical scan period Fd and the imaging vertical scan period Fs. In other words, a distance between the line L3 and the line L2 for each set of the vertical scan periods generally becomes short by the time corresponding to the difference between the display vertical scan period Fd and the imaging vertical scan period Fs.

Before the delays of the display, in which the preparation for display on the side of the display unit 40 becomes the bottleneck, are resolved, the line L2 timely precedes the line L3 (line L4). In contrast, in a case of a state in which the delays of the display, in which the preparation for display becomes the bottleneck, are resolved, it is assumed that there may be timing in which the line L4 indicative of the past time, in which it is possible to display the images on the side of the display unit 40, timely precedes the line L2 as a virtual state although such a case does not actually occur. That is, it is understood that, timing, in which the delays of the display in which the preparation for display becomes the bottleneck are resolved, may be timing in which the line L2 crosses the line L4 in the rapidest state in the virtual state.

Meanwhile, as described above, there is the case where the line L2 becomes the polygonal line instead of the straight line. In this case, it is understood that the cross between the line L2 and the virtual line L4 may occur a plurality of times.

In the example illustrated in FIG. 12, the line L2 indicative of time in which the image processing unit 21 generates an image signal D2[m] (DGA2[m]) based on an imaging signal DS2[p] (DGS2[m]), which is output by the imaging unit 10 in an imaging vertical scan period Fs2, crosses the line L4 indicative of a past time in which it is possible for the display unit 40 to display an image indicated by the image signal D2[m] (DGA2[m]) in the display vertical scan period Fd2. Such a state in which the line L2 crosses the line L4 is referred to as a "second state". Meanwhile, in a case where the cross between the line L2 and the line L4 occurs a plurality of times, a state in which the cross initially occurs is referred to as the "second state". In addition, time in which the line L2 crosses the line L4 is referred to as time Tth. Meanwhile, in the case where the cross between the line L2 and the line L4 occurs a plurality of times, time in which the cross initially occurs is referred to as the time Tth.

That is, the second state indicates transition from a state (a state in which the line L2 normally timely precedes the line L3), in which the image processing unit 21 is not ready to perform the preparation for display of the image indicated by the image signals D[m] in the display unit 40 when the image signals D[m] are generated based on the imaging signals DS[p], to a state (a state in which there is a case where the line L4 timely precedes the line L2) in which there is a case where the image processing unit 21 does not complete the image process of generating the image signals D[m] when it is possible to display the image indicated by the image signals D[m] in the display unit 40.

That is, before the time Tth, the second state is a state in which the image indicated by the image signals D[m] is displayed without delays in timing in which it is possible for the display unit 40 to display the image indicated by the image signals D[m]. In contrast, after the time Tth, the second state is a state in which the image process in the image processing unit 21 that generates the image signals D[m] is not inadequate even in time in which it is possible to display the image signals D[m] on the side of the display unit 40, and thus there is a case where the display of the image in the display unit 40 is delayed because the image process of the image processing unit 21 becomes the bottleneck.

In the second state, a phase difference PD2 (a symbol PD2 is attached as the phase difference PD in the second state as illustrated in FIG. 12) is shorter than the phase difference PD1 as illustrated in FIG. 12.

Meanwhile, after the time Tth, the timing generator 32 inserts the invalid horizontal scan period Hd-D into the vertical valid data period DVI one time, and adjusts the timing in which the image signals D[m] are output from the image signal output unit 23 (timing in which the images indicated by the image signals D[m] are displayed in the display unit 40). However, in a case where the image signals D[m] in the image processing unit 21 which generates the image signals D[m] are inadequate even though insertion into the invalid horizontal scan period Hd-D is performed one time, insertion into a subsequent invalid horizontal scan period Hd-D is further repeated. Furthermore, in a case where the image signals D[m] are generated after waiting the completion of the image process of generating the image signals D[m], the image indicated by the image signals D[m] is displayed in the time which is equal to or shorter than the horizontal scan period Hd. That is, after the time Tth, the timing in which the image signals D[m](DGB[m]) are output from the image signal output unit 23 is adjusted through insertion into the invalid horizontal scan period Hd-D, and the display timing on the side of the display unit 40 is caused to follow an image process completion timing in the image processing unit 21 with accuracy of the horizontal scan period Hd.

As illustrated in FIG. 12, the line L4 indicative of the past time, in which it is possible for the display unit 40 to display the image indicated by the image signal D3[m] (DGA3[m]) in the display vertical scan period Fd3, timely precedes the line L2 indicative of the time in which the image processing unit 21 generates the image signal D3[m] (DGA3[m]) based on the imaging signal DS3[p] (DGS3[m]) which is output in an imaging vertical scan period Fs3. Such a state in which the line L4 timely precedes the line L2 is referred to as a "third state". In other words, a state in the imaging vertical scan period Fs and the display vertical scan period Fd which start after the time Tth is the third state.

That is, the third state is a state in which the image processing unit 21 does not complete the image process of generating the image signals D[m] when the preparation for display of the image indicated by the image signals D[m] is completed in the display unit 40.

That is, in the third state, since the image process of generating the image signals D[m] in the image processing unit 21 is inadequate even though the preparation for display of the image signals D[m] is completed on the side of the display unit 40, thereby causing a state in which the display of the image in the display unit 40 is delayed because the image process of the image processing unit 21 becomes the bottleneck.

In the third state, a phase difference PD3 (a symbol PD3 is attached as the phase difference PD in the third state as illustrated in FIG. 12) has a length which is equal to or shorter than the phase difference PD2 as illustrated in FIG. 12. Meanwhile, the phase difference PD1 in the first state is longer than the image process time UA (more specifically, the maximum value of the image process times UA[1] to UA[M]), and the phase difference PD3 in the third state is equal to or smaller than the maximum value of the image process times UA[1] to UA[M].

Meanwhile, even in the third state, the timing generator 32 inserts the invalid horizontal scan period Hd-D into the vertical valid data period DVI, and adjusts the displaying timing of the image indicated by the image signals D[m] in the display unit 40. Therefore, it is possible to cause the display timing on the side of the display unit 40 to follow the image process completion timing in the image processing unit 21 with the accuracy of the horizontal scan period Hd.

As described above, the image process time UA is varied for each line. However, a variation width thereof is sufficiently small compared to the imaging vertical scan period Fs. Therefore, in a state of causing the timing in which the image signals D[m] are output (the display timing on the side of the display unit 40) to follow the image process completion timing in the image processing unit 21, a time length of a period, in which the imaging unit 10 is outputting the imaging signal DS3, is approximately the same as a time length of a period, in which the image signal output unit 23 is outputting the image signal DGB3. In other words, in the third state, the timing control unit 30 adjusts timing in which the image signals D[m] are output such that the frame rate of the display unit 40 becomes the frame rate of the imaging unit 10.

Meanwhile, in FIG. 12, for convenience of illustration, only one set of vertical scan periods including one imaging vertical scan period Fs (Fs3) and one display vertical scan period Fd (Fd3) is described as the third state. However, actually, a plurality of sets of vertical scan periods exist. In the third state, in each of the plurality of sets of the vertical scan periods, the timing in which the image signals D[m] are output is adjusted such that a time length of a period in which the imaging unit 10 is outputting the imaging signal DS3 is approximately the same as a time length of a period in which the image signal output unit 23 is outputting the image signal DGB3. That is, in the third state, in each of the plurality of sets of the vertical scan periods, the timing in which the image signals D[m] are output is adjusted such that the frame rate of the display unit 40 becomes the frame rate of the imaging unit 10. Therefore, in the third state, the phase difference PD3 has approximately the same time length in each of the plurality of sets of the vertical scan periods.

Hereinafter, the first state will be described with reference to FIGS. 12 and 13 while using a relationship between the imaging signal DS1 (DGS1), which is output by the imaging unit 10 in the imaging vertical scan period Fs1, and the image signal D1 (DGB1), which is output to the display unit 40 by the image signal generation unit 20 in the display vertical scan period Fd1, as an example.

Figure 13:
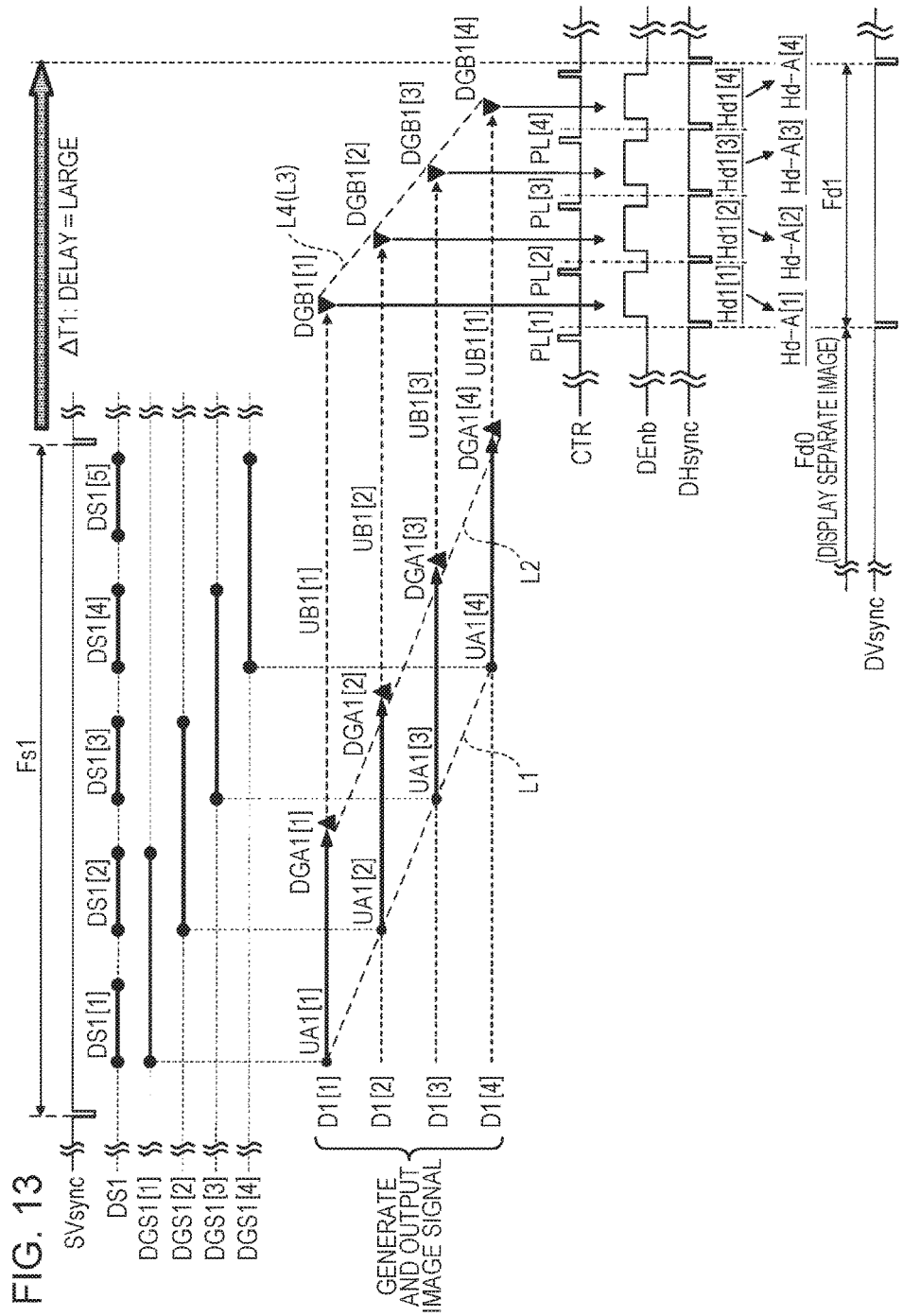
FIG. 13 is a timing chart illustrating the operation of the imaging display apparatus 1.

FIG. 13 is a timing chart illustrating a relationship between the imaging signal DS1[p] (imaging signal DGS1[m]) and the image signal D1[m] (the image signal DGA1[m] and the image signal DGB1[m]).

Meanwhile, in FIG. 13 and FIGS. 14 and 15, which will be described later, a case is assumed where the number of lines of the image indicated by the imaging signal DS is five lines (P=5) and the number of lines of the image indicated by the image signal D is four lines (M=4) for simplification. In addition, in examples illustrated in FIGS. 13 to 15, a case in assumed where the imaging signal DGS[1] includes the imaging signals DS[1] and DS[2], the imaging signal DGS[2] includes the imaging signals DS[2] and DS[3], the imaging signal DGS[3] includes the imaging signals DS[3] and DS [4], and the imaging signal DGS[4] includes the imaging signals DS[4] and DS[5]. That is, in the examples illustrated in FIGS. 13 to 15, a case is assumed where the image signal D[1] is generated based on the imaging signals DS[1] and DS[2], the image signal D[2] is generated based on the imaging signals DS[2] and DS[3], the image signal D[3] is generated based on the imaging signals DS[3] and DS[4], and the image signal D[4] is generated based on the imaging signals DS[4] and DS[5].

As illustrated in FIG. 13, in a case where imaging signals DS1[m] and DS1[m+1] are output from the imaging unit 10 (for convenience, output of the imaging signal DGS1[m] starts), the image processing unit 21 starts generation of the image signal DGA1[m] based on the imaging signal DGS1[m]. Furthermore, the image processing unit 21 completes the generation of the image signal DGA1[m] after image process time UA1[m] elapses from the start of the image process, and stores the generated signal DGA1[m] in the line buffer 22.

In contrast, the example illustrated in FIG. 13 exemplifies the above-described first state, and thus the line L2 timely precedes the line L3. That is, in the example illustrated in FIG. 13, preparation for display of an image indicated by the image signal DGB1[m] is not enabled in the display unit 40 in timing in which the generation of the image signal DGA1[m] is completed by the image processing unit 21. In other words, in the timing in which the generation of the image signal DGA1[m] is completed by the image processing unit 21, the output permission pulse PL[m] is not output from the output control unit 31.

Therefore, the image signal output unit 23 waits for the output of the image signal DGB1[m] for waiting time UB1[m] until a first horizontal scan period Hd1[m] after the output permission pulse PL[m] is output. Thereafter, the image signal output unit 23 outputs the image signal DGB1[m] in the horizontal scan period Hd1[m].

In addition, the first state illustrated in FIG. 13 is a case where the preparation for display by the display unit 40 is late for the completion of the image process by the image processing unit 21. In other words, the first state is a state in which the generation of the image signal DGA1[m] is completed by the image processing unit 21 and it is possible to output the image signal DGB1[m] from the image signal output unit 23 until the horizontal scan period Hd1[m] starts. Therefore, in the first state illustrated in FIG. 13, all of the horizontal scan periods Hd, which are included in the vertical valid data period DVI of the display vertical scan period Fd1, from the valid horizontal scan period Hd-A. That is, in the first state, the time length of the display vertical scan period Fd becomes the standard vertical scan time Td.

As described above, in the first state illustrated in FIG. 13, although the image process of generating the image signal D1 is completed with a sufficient margin, the preparation for display on the side of the display unit 40 becomes the bottleneck, thereby display in the display unit 40 is delayed.

Therefore, delay time $\Delta T1$, which is taken after the imaging unit 10 outputs the imaging signal DS1 until the display unit 40 displays an image indicated by the image signal D1, is time acquired by adding time (image process time UA) which is necessary for the image process in the image signal generation unit 20 to time (waiting time UB) taken for waiting for the preparation for display in the display unit 40 after completing the image process.

Subsequently, the second state will be described by exemplifying the relationship between an imaging signal DS2 (DGS2), which is output by the imaging unit 10 in the imaging vertical scan period Fs2, and an image signal D2 (DGB2), which is output to the display unit 40 by the image signal generation unit 20 in the display vertical scan period Fd2, with reference to FIGS. 12 and 14.

Figure 14:
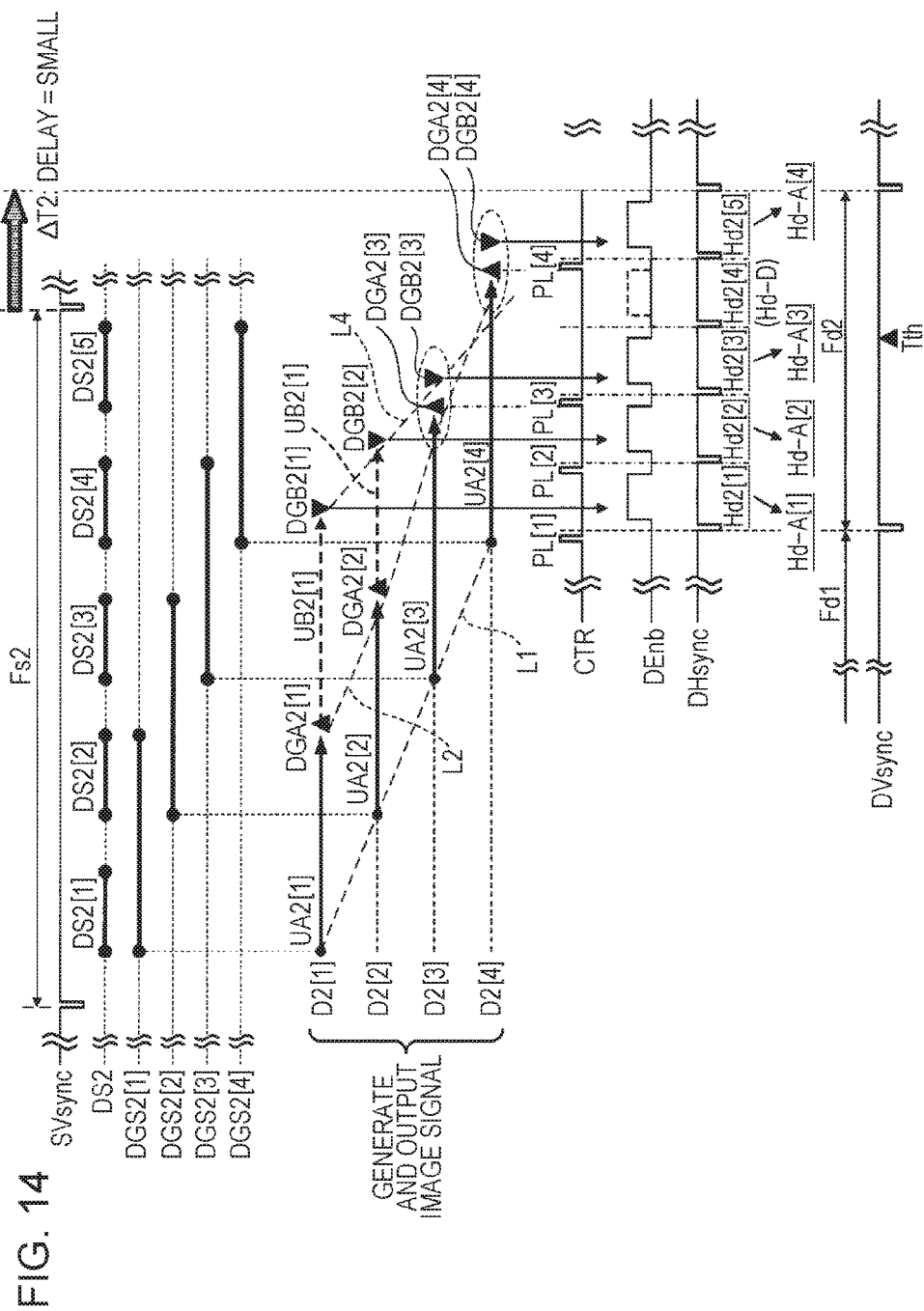
FIG. 14 is a timing chart illustrating the operation of the imaging display apparatus 1.

FIG. 14 is a timing chart illustrating a relationship between the imaging signal DS2[p] (the imaging signal DGS2[m]) and the image signal D2[m] (an image signal DGA2[m] and an image signal DGB2 [m]).

As illustrated in FIG. 14, in a case where an imaging signal, which includes imaging signals DS2[m] and DS2[m+1], is output from the imaging unit 10 (for convenience, output of DGS2[m] starts), the image processing unit 21 starts generation of the image signal DGA2[m] based on the imaging signal DGS2[m]. Furthermore, the image processing unit 21 completes the generation of the image signal DGA2[m] after an image process time UA2[m] elapses from the start of the image process, stores the image signal DGA2[m] in the line buffer 22.

Meanwhile, in the example illustrated in FIG. 14, a case is assumed where image signals D2[1], D2[2], and D2[3] correspond to the image signals D[m] which are output by the image signal output unit 23 before time Tth and an image signal D2[4] corresponds to the image signals D[m] which are output by the image signal output unit 23 after time Tth.

Before time Tth, the line L2 timely precedes the line L3 (line L4). That is, before the time Tth, the output permission pulse PL[m] is not output from the output control unit 31 in timing in which the generation of the image signal DGA2[m] is completed by the image processing unit 21.

Therefore, before the time Tth, the image signal output unit 23 waits for the output of the image signal DGB2[m] for waiting time UB2 [m] until a first horizontal scan period Hd2[m] after the output permission pulse PL[m] is output. Thereafter, the image signal output unit 23 outputs the image signal DGB2 [m] in the horizontal scan period Hd2[m].

In the example illustrated in FIG. 14, the image signal output unit 23 waits for the output of an image signal DGB2[1] for waiting time UB2[1] after an image signal DGA2[1] is generated. Thereafter, the image signal output unit 23 outputs the image signal DGB2[1] in a horizontal scan period Hd2[1]. Similarly, the image signal output unit 23 waits for the output of an image signal DGB2[2] for waiting time UB2[2] after an image signal DGA2[2] is generated. Thereafter, the image signal output unit 23 outputs the image signal DGB2[2] in a horizontal scan period Hd2[2].

In contrast, after the time Tth, normally, the line L4 timely precedes the line L2. In a case where the line L4 timely precedes the line L2 and the image processing unit 21 generates the image signal DGA2[m], the display unit 40 is capable of displaying an image indicated by the image signal DGB2[m] immediately (in the immediately after horizontal scan period Hd). Accordingly, in the case where the line L4 timely precedes the line L2, the output permission pulse PL[m] is output from the output control unit 31 in timing in which the generation of the image signal DGA2[m] is completed by the image processing unit 21.

In the example illustrated in FIG. 14, the image signal output unit 23 outputs an image signal DGB2[3] in a first horizontal scan period Hd2[3] after an image signal DGA2[3] is generated and the output permission pulse PL[3] is output.

In addition, in the example illustrated in the drawing, an image signal DGA2[4] is generated after a horizontal scan period Hd2[4] starts. Therefore, the image signal output unit 23 outputs an image signal DGB2[4] in a first horizontal scan period Hd2[5] after the image signal DGA2[4] is generated and an output permission pulse PL[4] is output. Furthermore, the timing generator 32 sets the horizontal scan period Hd2[4] to the invalid horizontal scan period Hd-D.

As described above, in the second state illustrated in FIG. 14, delays of display occur due to the image process after the time Tth, the invalid horizontal scan period Hd-D is inserted into the vertical valid data period DVI of the display vertical scan period Fd2. That is, in the second state, the time length of the display vertical scan period Fd is the sum of the standard vertical scan time Td and the extended vertical scan time Tex.

In addition, before the time Tth, delay time ΔT2, which is taken after the imaging unit 10 outputs the imaging signal DS2 until the display unit 40 displays an image indicated by the image signal D2, is time acquired by adding time (image process time UA) which is necessary for the image process in the image signal generation unit 20 to time (waiting time UB) which is necessary to wait for the preparation for display in the display unit 40. After the time Tth, in a case where the line L4 timely precedes the line L2, the delay time ΔT2 includes only the time (image process time UA) which is necessary for the image process in the image signal generation unit 20. Therefore, the delay time ΔT2 according to the second state is shorter than the delay time ΔT1 according to the first state.

Subsequently, the third state will be described by exemplifying a relationship between the imaging signal DS3 (DGS3), which is output by the imaging unit 10 in the imaging vertical scan period Fs3, and the image signal D3 (DGB3), which is output to the display unit 40 by the image signal generation unit 20 in the display vertical scan period Fd3, with reference to FIGS. 12 and 15.

Figure 15:
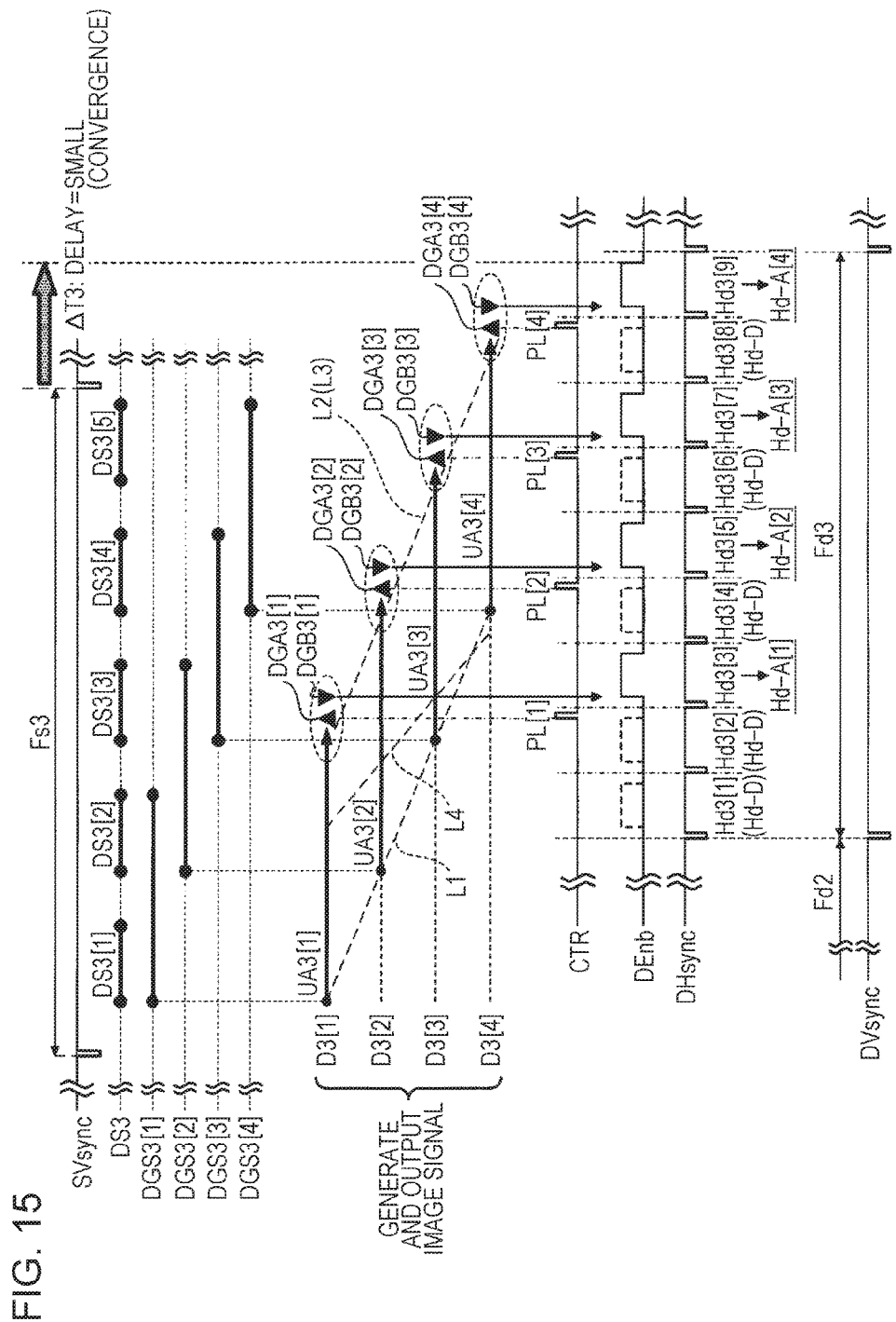
FIG. 15 is a timing chart illustrating the operation of the imaging display apparatus 1.

FIG. 15 is a timing chart illustrating the relationship between the imaging signal DS3[p] (the imaging signal DGS3[m]) and the image signal D3[m] (the image signal DGA3[m] and the image signal DGB3[m]).

As illustrated in FIG. 15, in a case where an imaging signal, which includes imaging signals DS3[m] and DS3[m+1], is output from the imaging unit 10 (for convenience, the output of DGS3[m] starts), the image processing unit 21 starts generation of the image signal DGA3[m] based on the imaging signal DGS3[m]. Furthermore, the image processing unit 21 completes the generation of the image signal DGA3[m] after image process time UA3[m] elapses from the start of the image process, and stores the image signal DGA3[m] I the line buffer 22.

In the third state, normally, the line L4 timely precedes the line L2. In a case where the line L4 timely precedes the line L2 and the image processing unit 21 generates the image signal DGA3[m], the display unit 40 is capable of displaying an image indicated by the image signal DGB3[m] immediately (in the immediately after horizontal scan period Hd). Accordingly, in this case, the output permission pulse PL[m] is output from the output control unit 31 in timing in which the generation of the image signal DGA3[m] is completed by the image processing unit 21.

Specifically, in the example illustrated in FIG. 15, image signal output unit 23 outputs an image signal DGB3[1] in a first horizontal scan period Hd3[3] after an image signal DGA3[1] is generated and the output permission pulse PL[1] is output, outputs an image signal DGB3[2] in a first horizontal scan period Hd3[5] after an image signal DGA3[2] is generated and the output permission pulse PL[2] is output, outputs an image signal DGB3[3] in a first horizontal scan period Hd3[7] after an image signal DGA3[3] is generated and the output permission pulse PL[3] is output, and outputs an image signal DGB3[4] in a first horizontal scan period Hd3[9] after an image signal DGA3[4] is generated and the output permission pulse PL[4] is output.

Meanwhile, in this case, although the vertical valid data period DVI of the display vertical scan period Fd1 starts, the output permission pulse PL[1] is not output. Therefore, the timing generator 32 performs a process of outputting the invalid horizontal scan period Hd-D in horizontal scan periods Hd3[1] and Hd3[2], and, similarly, outputting the invalid horizontal scan period Hd-D in Hd3[4], Hd3[6], and Hd3[8].

As described above, in the third state illustrated in FIG. 15, delays of display occur due to the image process, and thus the invalid horizontal scan period Hd-D is inserted into the vertical valid data period DVI of the display vertical scan period Fd3. As a result, in the third state, the time length of the display vertical scan period Fd is adjusted with the accuracy of the horizontal scan period Hd such that the display unit 40 is capable of performing display in synchronization with the imaging signal DS which is output in the imaging vertical scan period Fs. That is, when schematically viewed, in the third state, the display vertical scan period Fd is adjusted such that the display vertical scan period Fd becomes time which is approximately the same as the imaging vertical scan period Fs.

In addition, in the third state, in a case where the line L4 timely precedes the line L2, the display unit 40 displays the image indicated by the image signal D[m] in the first horizontal scan period Hd after the image processing unit 21 generates the image signal D[m]. Therefore, delay time ΔT3, which is taken after the imaging unit 10 outputs the imaging signal DS3 until the display unit 40 displays the image indicated by the image signal D3, is approximately the same as time (image process time UA) which is necessary for the image process in the image signal generation unit 20. Specifically, in the third state, the delay time ΔT3, which is taken after the imaging unit 10 starts the output of the imaging signal DS[p] until the display unit 40 starts the display of the image indicated by the image signal D[m], is caused to be equal to the image process time UA, which is necessary for the image processing unit 21 to generate the image signal D[m], with the accuracy of the horizontal scan period Hd.

Therefore, in the third state, it is possible to minimize delays from the imaging performed by the imaging unit 10 until the display performed by the display unit 40, with the accuracy of the horizontal scan period Hd. In this case, the delay time ΔT3 becomes shorter than the delay time ΔT1 according to the first state, and, becomes equal to or shorter than the delay time ΔT2 according to the second state.

In addition, as described above, time (cycle) which is necessary to display one screen by the display unit 40 is shorter than time (cycle) which is necessary to image one screen by the imaging unit 10. Therefore, the delays of display for each imaging vertical scan period Fs are gradually reduced even in a case where the imaging display apparatus 1 operates in the first state and delays of display, in which the preparation for display on the side of the display unit 40 becomes the bottleneck, occur.

That is, even in a case where the imaging display apparatus 1 initially operates in the first state, the imaging display apparatus 1 finally transitions to an operation in the third state. After the operation in the third state starts, the imaging display apparatus 1 is capable of maintaining the operation in the third state. As a result, it is possible to cause the display timing on the side of the display unit 40 to follow the image process completion timing in the image processing unit 21 with the accuracy of the horizontal scan period Hd.

Therefore, in a case where the imaging display apparatus 1 starts an operation in the live view mode, it is possible to minimize the delay time from the imaging performed by the imaging unit 10 until the display of an image performed by the display unit 40, excepting immediately after the starting of the operation in the live view mode, with the accuracy of the horizontal scan period Hd.

4. Advantage of First Embodiment

In the imaging display apparatus 1 according to the embodiment, the image signal D[m] is output from the image signal output unit 23 in a case where the first condition and the second condition are satisfied, and the invalid horizontal scan period Hd-D is inserted in a case where the first condition or the second condition is not satisfied, and thus the timing in the image signal D[m] is output from the image signal output unit 23 is adjusted with the accuracy of the horizontal scan period Hd. That is, in the imaging display apparatus 1 according to the embodiment, it is possible for the display unit 40 to display the image indicated by the image signal D[m] in the first horizontal scan period Hd after the image processing unit 21 generates the image signal D[m]. Accordingly, it is possible to minimize the delays from the capturing an image by the imaging unit 10 until the display performed by the display unit 40 with the accuracy of the horizontal scan period Hd.

In addition, in the imaging display apparatus 1 according to the embodiment, it is possible to vary the time length of the display vertical scan period Fd and to maintain a state, in which the time length of the display vertical scan period Fd is approximately the same as the time length of the imaging vertical scan period Fs, by inserting the invalid horizontal scan period Hd-D into the vertical valid data period DVI. Therefore, it is possible to realize high-quality display from which flickering on display is suppressed.

B. Second Embodiment

In the above-described first embodiment, as illustrated in FIG. 6, the timing, in which the image signal D[m] is output, is adjusted with the accuracy of the horizontal scan period Hd by inserting the invalid horizontal scan period Hd-D into the vertical valid data period DVI, and the time length of the horizontal scan period Hd is set to a fixed length.

In contrast, in the imaging display apparatus according to the second embodiment, the facts that the time length of the horizontal scan period Hd is set to a variable length and the timing, in which the image signal D[m] is output, is adjusted by, for example, a cycle of the display dot clock signal DCLK are different from the imaging display apparatus 1 according to the first embodiment.

Hereinafter, an imaging display apparatus according to the second embodiment will be described with reference to FIGS. 16 to 18. Meanwhile, in the second embodiment which will be exemplified below, symbols which are referred to in the above description are used for components which have the equivalent operations and function as in the first embodiment, and the detailed description of each of the components will be appropriately omitted (similar to a modified example which will be described below).

Figure 16:
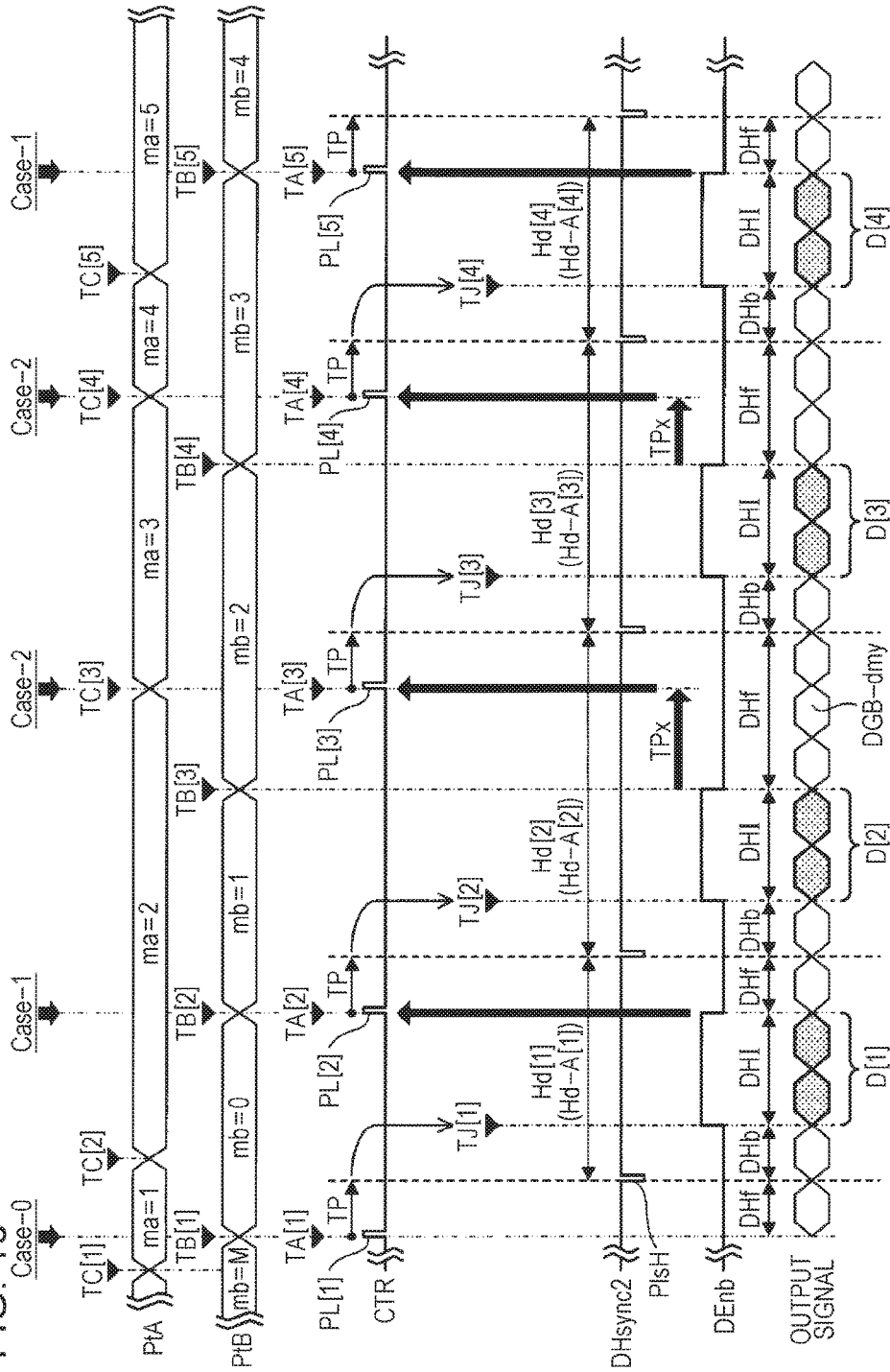
FIG. 16 is a timing chart illustrating an operation of an imaging display apparatus according to a second embodiment of the present invention.

FIG. 16 is an explanatory diagram illustrating a relationship between an output control signal CTR, an enable signal DEnb, and a display horizontal synchronization signal DHsync2 which are generated by an timing control unit 30 (an output control unit 31 and an timing generator 32) included in the imaging display apparatus according to the second embodiment.

The timing control unit 30, which is included in the imaging display apparatus according to the second embodiment, has the same configuration as in the imaging display apparatus 1 according to the first embodiment (refer to FIG. 6) excepting facts that the timing generator 32 generates the display horizontal synchronization signal DHsync2 which has the horizontal synchronization pulse PlsH of a variable cycle instead of the display horizontal synchronization signal DHsync, and generates a display vertical synchronization signal DVsync2 which has a vertical synchronization pulse PlsV of a variable cycle instead of the display vertical synchronization signal DVsync.

As illustrated in FIG. 16, similarly to the first embodiment, the output control unit 31 according to the second embodiment sets the output control signal CTR to the output permission pulse PL[m] in late time (the image process determination time TA[m] because the above-described second aspect is used in the drawing) between the image process determination time TA[m] and the display preparation determination time TB[m].

In addition, as illustrated in FIG. 16, the timing generator 32 according to the second embodiment outputs the horizontal synchronization pulse PlsH as the display horizontal synchronization signal DHsync2 after reference front porch time TP, which is a fixed time length, elapses from timing in which the output control signal CTR, which is output by the output control unit 31, is set to the output permission pulse PL[m].

Therefore, in a case (Case-1) where the generation of the image signal D[m] is completed until the display preparation determination time TB[m] and the image signal generation time TC[m] elapses, the time length of the horizontal front porch period DHf becomes the reference front porch time TP.

In contrast, in a case (Case-2) where the generation of the image signal D[m] is not completed until the display preparation determination time TB[m], that is, the image signal generation time TC[m] arrives later than the display preparation determination time TB[m], the time length of the horizontal front porch period DHf is acquired by adding the reference front porch time TP to extended front porch time TPX which is the time length from the display preparation determination time TB[m] to the image signal generation time TC[m] (image process determination time TA[m]).

As described above, the timing generator 32 according to the second embodiment determines that the output control unit 31 completes the preparation for the output of the image signal D[m], waits for the output permission pulse PL[m] to be output as the output control signal CTR, and starts the horizontal scan period Hd[m] after the reference front porch time TP elapses after the output permission pulse PL[m] is output. In other words, the timing generator 32 according to the second embodiment extends the horizontal front porch period DHf until the preparation for the output of the image signal D[m] is completed.

Therefore, for example, even in a case where the image process for the image signal D[m] is delayed in the image processing unit 21, it is possible for the image signal output unit 23 to output the image signal D[m] in the horizontal scan period Hd[m]. In this case, the delay time, after the imaging unit 10 outputs the imaging signal DGS[m] until the display unit 40 displays an image based on the image signal D[m], is minimized with the accuracy of the display dot clock signal DCLK.

Figure 17:
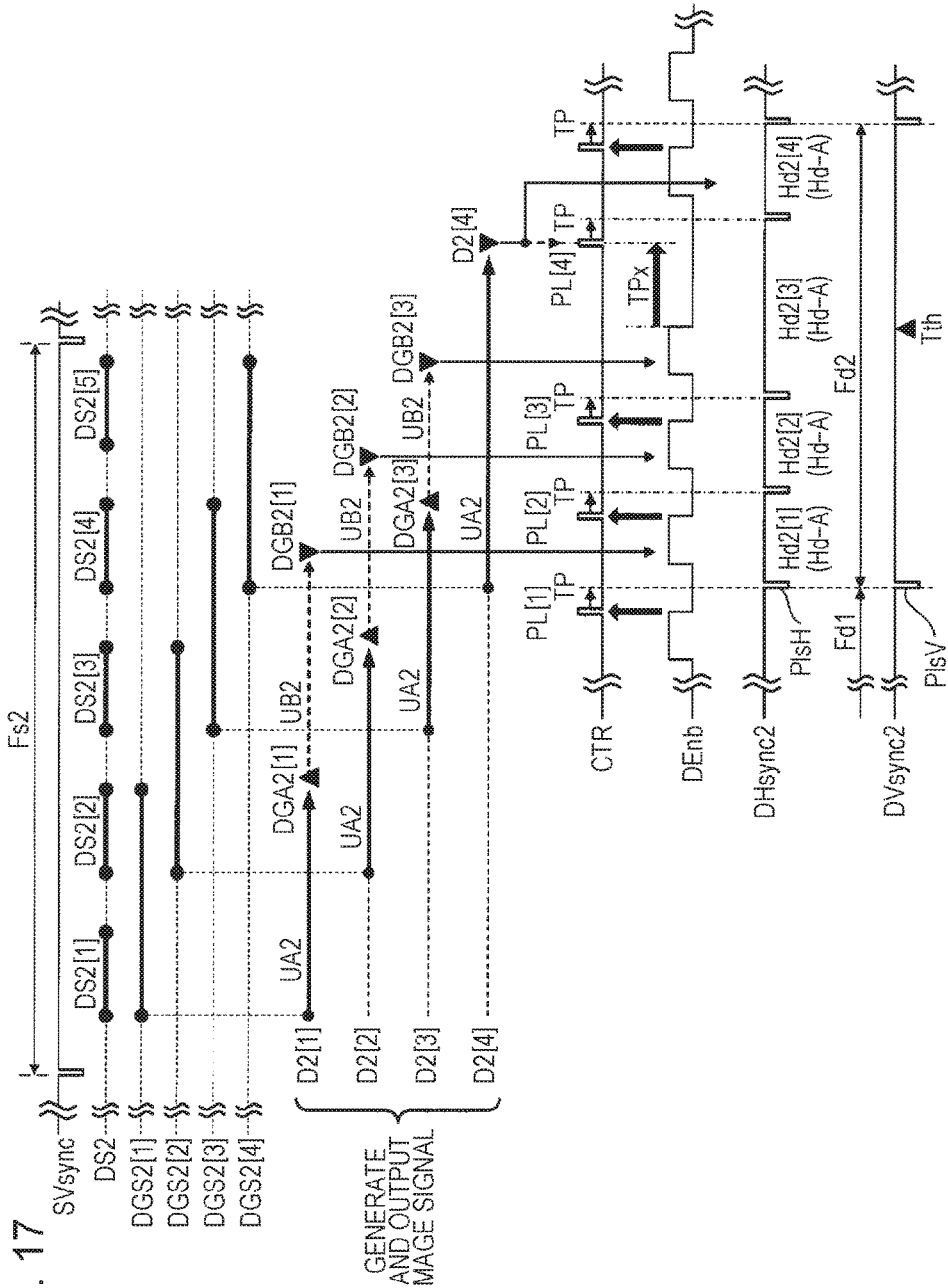
FIG. 17 is a timing chart illustrating the operation of the imaging display apparatus according to the second embodiment.

FIG. 17 is a timing chart illustrating an operation of the imaging display apparatus according to the second embodiment in a state in which the delays of display, in which the preparation for display in the display unit 40 becomes the bottleneck, are resolved (that is, the second state described with reference with FIG. 14). In addition, FIG. 18 is a timing chart illustrating an operation of the imaging display apparatus according to the second embodiment in a state in which the image process performed by the image processing unit 21 becomes the bottleneck and delays occur in display (that is, the third state described with reference with FIG. 15). Meanwhile, in FIGS. 17 and 18, symbols, which are described in FIGS. 12 to 15, are used.

In FIG. 17, for example, the image signal DGA2[3] is generated up to timing in which the enable signal DEnb falls in the horizontal scan period Hd2[2]. Therefore, in the timing in which the enable signal DEnb falls in the horizontal scan period Hd2[2], the output permission pulse PL[3] is output. In this case, the time length of the horizontal front porch period DHf of the horizontal scan period Hd2[2] becomes the reference front porch time TP.

In contrast, in the example illustrated in the drawing, timing in which the image signal DGA2[4] is generated is later than timing in which the enable signal DEnb falls in the horizontal scan period Hd2[3]. Therefore, in timing in which the image signal DGA2[4] is generated, the output permission pulse PL[4] is output. In this case, the time length of the horizontal front porch period DHf of the horizontal scan period Hd2[3] is a time length acquired by adding the reference front porch time TP to the extended front porch time TPX (time after timing in which the enable signal DEnb falls in the horizontal scan period Hd2[3] until the output permission pulse PL[4] is output). That is, after the time Tth in which the delays of display, in which the preparation for display in the display unit 40 becomes the bottleneck, are resolved, the horizontal scan period Hd is extended according to a situation of the image process.

In addition, in FIG. 18, timing in which the image signal DGA3[m] is generated is later than timing in which the enable signal DEnb falls in a horizontal scan period Hd3[m−1]. Therefore, in the timing in which the image signal DGA3[m] is generated, the output permission pulse PL[m] is output. In this case, the time length of the horizontal front porch period DHf of the horizontal scan period Hd3[m] is a time length acquired by adding the reference front porch time TP to the extended front porch time TPX (time from the timing in which the enable signal DEnb falls in the horizontal scan period Hd3[m] until the output permission pulse PL[m] is output). That is, in the state (third state) in which delays occur in display because the image process of the image processing unit 21 becomes the bottleneck, the horizontal scan period Hd is extended according to the situation of the state image process.

Figure 18:
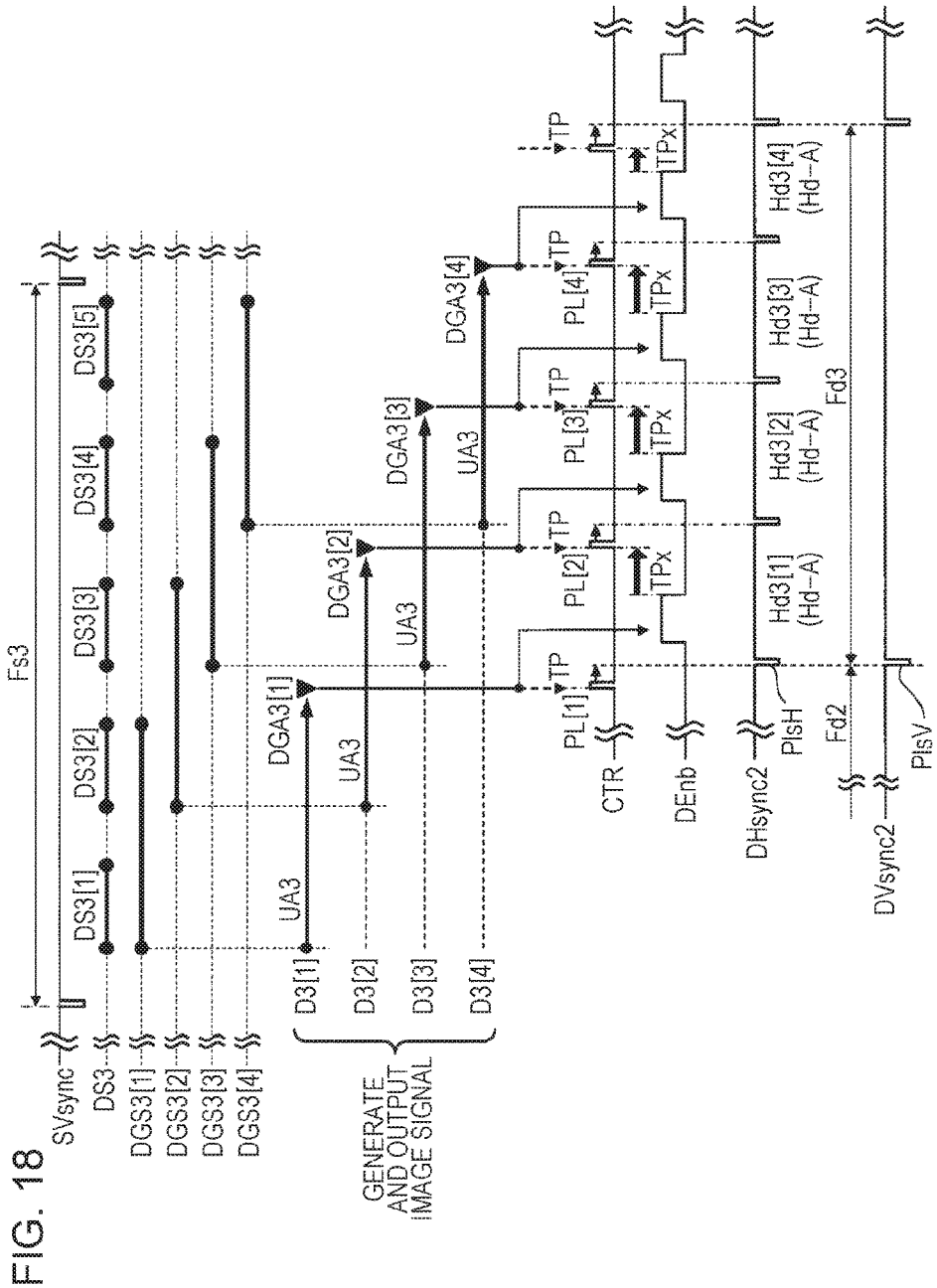
FIG. 18 is a timing chart illustrating the operation of the imaging display apparatus according to the second embodiment.

Meanwhile, as being clear with reference to FIGS. 17 and 18, in the second embodiment, the invalid horizontal scan period Hd-D does not exist and the whole horizontal scan period Hd is the valid horizontal scan period Hd-A.

In addition, in the second embodiment, the horizontal scan period Hd varies, for example, in units of the display dot clock signal DCLK, and thus the display vertical scan period Fd also has a variable time length.

C. Modified Example

Respective forms below may be variously modified. Detailed modified aspects will be exemplified below. Two or more aspects, which are randomly selected from exemplifications below, may be merged in a range being not mutually contradictory. Meanwhile, in the modified examples which will be described below, features which are common to the above-described embodiments of the present invention will not be described in order to avoid duplication of the explanation.

First Modified Example

In the above-described embodiment, the case where the display unit 40 includes the liquid crystal panel 42 is exemplified. However, the present invention is not limited to the aspect, and a display element, such as an Organic Light Emitting Diode (OLED) panel or a plasma display panel, may be used.

Second Modified Example

In the above-described embodiments and the modified example, data transmission between the image process circuit 100 and the display unit 40 is performed through a parallel interface. However, the data transmission may be performed through a serial interface of a Low Voltage Differential (LVDS).

Third Modified Example

In the above-described embodiment and modified example, the imaging vertical scan period Fs, which is prescribed by the imaging vertical synchronization signal SVsync, has a time length that is equal to or longer than the display vertical scan period Fd which is prescribed by the display vertical synchronization signal DVsync (or DVsync2). However, the present invention is not limited to the aspect. The imaging vertical scan period Fs may has a time length that is shorter than the display vertical scan period Fd.

Fourth Modified Example

In the above-described embodiment and modified example, the output control unit 31 determines whether or not the preparation for the output of the image signal D[m] is completed based on the write completion signal PtA, which is output by the image processing unit 21, and the output completion signal PtB, which is output by the image signal output unit 23. However, the present invention is not limited to the aspect. Whether or not the preparation for the output of the image signal D[m] is completed may be determined by determining whether or not the image signal D[m] is recorded in the line buffer 22 and whether or not the image signal D[m−1] is read from the line buffer 22 in such a way that the output control unit 31 periodically refers to the line buffer 22.

Fifth Modified Example

In the above-described embodiment and modified example, the display unit 40 is built in the imaging display apparatus 1. However, the present invention is not limited to the aspect. The display unit 40 may be formed as a finder (display apparatus), which is connected to the outside of the digital camera, or the like.

D. Application Example

The imaging display apparatus 1, which is exemplified in each of the above-described embodiments, may be used for various electronic apparatuses. For example, the imaging display apparatus 1 may be formed as an electronic apparatus (display apparatus) or the like, such as a projector apparatus, a Head Up Display (HUD), or a Head-Mounted Display (HMD). In addition, in a case of an display apparatus which performs the live view, it is possible to apply the display apparatus to, for example, an electronic binoculars, electronic glasses, an electron microscope, finders of medical electronic glasses, a back monitor of a vehicle, a monitor of a side-view mirror of a vehicle, and the like, and it is possible to reduce delays after capturing an image until display. In addition, in the aspect of the display apparatus, the imaging unit 10 may not be necessarily included. That is, the image process circuit 100 and the display unit 40, to which the imaging signal DS is supplied, may be grasped as the display apparatus.

The entire disclosure of Japanese Patent Application No. 2014-162105, filed Aug. 8, 2014 and Japanese Patent Application No. 2015-134238, filed Jul. 3, 2015 are expressly incorporated by reference herein.

REFERENCE SIGNS LIST 1 imaging display apparatus
10 imaging unit
11 imaging optical system
12 image sensor
13 timing generator
20 image signal generation unit
21 image processing unit
22 line buffer
23 image signal output unit
30 timing control unit
31 output control unit
32 timing generator
33 parameter transmission unit
40 display unit
41 EVF controller
42 liquid crystal panel
50 CPU
60 manipulation unit
100 image process circuit

The invention claimed is:

1. An imaging apparatus comprising:
an imaging sensor that captures an image of a subject and outputs imaging signals;
an image signal generation circuit that generates image signals indicative of images to be displayed in respective lines of a display based on the imaging signals, and outputs the generated image signals to the display; and
a timing control circuit that controls timings, in which the image signal generation circuit outputs the image signals, based on display output line information indicative of lines corresponding to the image signals which are completely output from the image signal generation circuit to the display and image-processed line information indicative of lines corresponding to the image signals which are generated by the image signal generation circuit,
wherein, in a case where the display output line information indicates a line that displays an image previous to a display target line and the image-processed line information indicates a line that displays an image after timing in which an image is displayed in the display target line, the timing control circuit controls the image signal generation circuit to output an image signal indicative of the image to be displayed in the display target line.

2. The imaging apparatus according to claim 1,
wherein a frame rate of the display is equal to or higher than a frame rate of the imaging sensor.

3. The imaging apparatus according to claim 1,
wherein the display is capable of displaying the images in the respective lines for each period that is determined by a horizontal synchronization pulse which is output on a regular cycle,
wherein the image signal generation circuit outputs the image signals in synchronization with the horizontal synchronization pulse, and
wherein, in a case where the display output line information indicates the line which displays the image previous to the display target line and the image-processed line information indicates the line which displays the image in advance to the display target line, the timing control circuit controls the image signal generation circuit to stop an output of the image signal indicative of the image to be displayed in the display target line, and, thereafter, controls the image signal generation circuit to output the image signal indicative of the image to be displayed in the display target line in synchronization with the horizontal synchronization pulse which is output after the lines indicated by the image-processed line information become the display target line.

4. The imaging apparatus according to claim 1,
wherein the display is capable of displaying the images in the respective lines for each period that is determined according to the horizontal synchronization pulse,
wherein the image signal generation circuit outputs the image signals in synchronization with the horizontal synchronization pulse, and
wherein the timing control circuit is capable of outputting the horizontal synchronization pulse on a variable cycle, controls the image signal generation circuit to stop the output of the image signals indicative of the image to be displayed in the display target line while stopping the output of the horizontal synchronization pulse in a case where the display output line information indicates the line which displays the image previous to the display target line and the image-processed line information indicates the line which displays the image in advance to the display target line, and, thereafter, controls the image signal generation circuit to output the horizontal synchronization pulse and to output the image signal indicative of the image to be displayed in the display target line in synchronization with the output horizontal synchronization pulse in the case where the line indicated by the image-processed line information becomes the display target line.

5. An image processing apparatus comprising:
an image signal generation circuit that generates image signals indicative of images to be displayed in respective lines of a display based on imaging signals which are output by an imaging sensor that captures an image of a subject, and outputs the generated image signals to the display; and
a timing control circuit that controls timings, in which the image signal generation circuit outputs the image signals, based on display output line information indicative of lines corresponding to the image signals which are completely output from the image signal generation circuit to the display and image-processed line information indicative of lines corresponding to the image signals on which an image process by the image signal generation circuit is completed,
wherein, in a case where the display output line information indicates a line that displays an image previous to a display target line and the image-processed line information indicates a line that displays an image after timing in which an image is displayed in the display target line, the timing control circuit controls the image signal generation circuit to output an image signal indicative of the image to be displayed in the display target line.

6. An imaging display apparatus comprising:
a display; and
the imaging apparatus according to claim 1.

* * * * *